US012562033B2

(12) United States Patent
Alyekhin

(10) Patent No.: US 12,562,033 B2
(45) Date of Patent: Feb. 24, 2026

(54) SYSTEMS AND METHODS FOR REAL-TIME REBALANCING OF BET PORTFOLIOS IN THE PARI-MUTUEL BET ENVIRONMENT

(71) Applicant: Woodbine Entertainment Group, Toronto (CA)

(72) Inventor: Steven Alyekhin, Toronto (CA)

(73) Assignee: Woodbine Entertainment Group, Toronto (CA)

( * ) Notice: Subject to any disclaimer, the term of this patent is extended or adjusted under 35 U.S.C. 154(b) by 351 days.

(21) Appl. No.: 18/312,486

(22) Filed: May 4, 2023

(65) Prior Publication Data

US 2023/0360494 A1 Nov. 9, 2023

Related U.S. Application Data

(60) Provisional application No. 63/338,813, filed on May 5, 2022.

(51) Int. Cl.
*G07F 17/32* (2006.01)

(52) U.S. Cl.
CPC ........ *G07F 17/3288* (2013.01); *G07F 17/323* (2013.01)

(58) Field of Classification Search
CPC . G07F 17/3288; G07F 17/323; G07F 17/3244
See application file for complete search history.

(56) References Cited

U.S. PATENT DOCUMENTS

2021/0233365 A1 7/2021 McKeever et al.

FOREIGN PATENT DOCUMENTS

| | | | |
|---|---|---|---|
| CA | 3160192 | A1 | 5/2021 |
| CN | 109740123 | A | 5/2019 |
| WO | WO-2020/214699 | A1 | 10/2020 |

OTHER PUBLICATIONS

International Search Report and Written Opinion on PCT App.PCT/CA2023/050614 dated Jul. 17, 2023 (14 pages).

*Primary Examiner* — Kevin Y Kim
(74) *Attorney, Agent, or Firm* — Foley & Lardner LLP

(57) ABSTRACT

Systems and methods for real-time rebalancing of bet portfolios can include iteratively identifying live odds for a horse racing event. Each iteration can include (i) monitoring a plurality of electronic wagers submitted by a plurality of electronic devices corresponding to the horse racing event, (ii) calculating live data, probables data and will pays data, (iii) calculating an implied probability of winning in a first pool based on the calculated live data, probables data, and will pays data, and (iv) calculating implied win probabilities in a second pool for which odds or probables data isn't available. The systems and methods can include receiving, from a client device, a wager request including a request for a betting strategy recommendation based on undervalued horses, generating a real-time bet package based on the live odds and estimated odds for horses participating in a race, and transmitting the real-time bet package to the client device.

20 Claims, 9 Drawing Sheets

SYSTEMS AND METHODS FOR REAL-TIME REBALANCING OF BET PORTFOLIOS IN THE PARI-MUTUEL BET ENVIRONMENT

CROSS REFERENCE TO RELATED APPLICATIONS

This application claims the benefit of, and priority to, the U.S. Provisional Application No. 63/338,813 filed on May 5, 2022, and entitled "SYSTEMS AND METHODS FOR REAL-TIME REBALANCING OF BET PORTFOLIOS IN THE PARI-MUTUEL BET ENVIRONMENT," which is incorporated herein by reference in its entirety.

TECHNICAL FIELD

This application relates generally to monitoring electronic devices and execution of artificial intelligence and mathematical optimization models to generate and modify real-time electronic bet packages in the pari-mutuel bet environment.

BACKGROUND

Horse racing is a popular gambling opportunity where users can place wagers on various horses to win racing events. In North America and certain other jurisdictions around the world, betting on horse racing is administered using a pari-mutuel system where customers contribute bets to pools, which in turn are redistributed to winning wagers after a certain takeout. There are multiple bet types from single runner to multi-runner and even multi-race wagers. Due to the nature of the system, odds for horses in a horse racing event can change significantly over time based on the wagers of other participants. Changing odds dictate the potential payout, or the potential implied probability of winning. These values can fluctuate even after placing a wager. Conventionally, a user will manually monitor odds as they fluctuate and place a bet or multiple bets at a point in time to achieve a desired level of risk and expected payout. If the odds change significantly, the user may need to manually alter their bets to achieve the desired risk level and expected payout. However, this is both time consuming and practically challenging and typically requires canceling and replacing the bets. Due to this complexity and the fact that the odds may continue to change before the race begins, users often achieve sub-optimal or undesired results.

To assist wagerers, conventional online solutions and tip sheets utilize human-assisted or algorithmic methods to generate wager recommendations. However, these are typically generated prior to the race taking place and contain a set of simple or exotic wagers a customer can place manually using the conventional betting methods. Risk or expected payout of such wagers cannot be known as live odds are not available prior to the race opening for betting. Therefore these recommendations are typically not tied to live odds since any change in live odds can trigger a new recommendation, particularly as it relates to the allocation of wagers across various bet types. Making a solution that benefits the user by optimizing bets, including the allocation of wagers across bet types, using live odds and being truly real time calls for a unique technological implementation which is associated with a new set of challenges. For instance, the solution will consume high volumes of data in real time and will analyze a high number of permutations, specifically for exotic wagers.

SUMMARY

In view of the above, it is desired to have a system that can incorporate real-time odds as well as specific real-time and historical race attributes, to provide real-time betting packages with clear and concise output regarding risk and potential payout which customers can use to place bets using ADWs (advanced deposit wager organizations). The systems and methods described herein use mathematical and machine learning models that can be calibrated and trained using outcome information and wager information from historical horse racing events. The systems and methods described herein can monitor and iteratively create bet packages from customer runner selections or implement certain wagering strategies while calculating risk and expected payout in real-time. The systems and methods can also determine and provide bet packages based on risk tolerance, or expected payout or other constraints provided by a user. Estimated (or real) odds based on horse attributes can also be used to provide recommendations to bet on horses that may be undervalued given current live odds.

At least one aspect of the present disclosure is directed to a method. The method includes iteratively identifying, by a computer system including one or more processors, live odds for a horse racing event. Each iteration can include (i) monitoring a plurality of electronic wagers submitted by a plurality of electronic devices corresponding to the horse racing event, each electronic wager identifying at least one horse and a monetary amount associated with a bet on the at least one horse, (ii) calculating, based on monitored data, live data comprising win odds, probables data comprising expected payouts for single event wagers, and will pays data comprising expected payouts for multi-race wagers, (iii) calculating an implied probability of winning in one or more first pools of the horse racing event based on the calculated live data, probables data, and will pays data, and (iv) calculating implied win probabilities in one or more second pools of a horse racing event for which odds or probables data isn't available. The method includes the computer system receiving, from a client device, a wager request for the horse racing event. The wager request comprises a total wager amount. The method includes generating a real-time bet package for the client device based on the live odds and the wager request for the horse racing event, and transmitting, to the client device, the real-time bet package for display.

In some implementations, calculating the implied win probabilities in one or more second pools includes using a machine learning model to determine payout odds for the one or more second pools. The machine learning model can include a feedforward neural network.

In some implementations, generating the real-time bet package for the client device includes generating a bet package based on a payout constraint. The payout constraint can specify a minimum payout amount.

In some implementations, generating the real-time bet package for the client device includes generating a bet package based on a probability of payout constraint. The probability of payout constraint can specify a minimum probability of receiving a payout.

In some implementations, generating the real-time bet package for the client device includes generating a bet package based on a hedged betting model. The wager request can specify a first portion of the total wager amount to be assigned to a hedging portfolio and a second portion of the total wager amount to be assigned to a risky portfolio.

In some implementations, generating the real-time bet package for the client device includes generating generalized Dutch betting strategies with exactas.

At least one aspect of the present disclosure is directed to a system comprising one or more processors and a memory storing executable instructions. The executable instructions when executed by the one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event, the wager request comprising a total wager amount, generate a real-time bet package for the client device based on the live odds and the wager request for the horse racing event, and transmit, to the client device, the real-time bet package for display.

In some implementations, in calculating the implied win probabilities in one or more second pools, the one or more processors are configured to use a machine learning model to determine payout odds for the one or more second pools. The machine learning model can include a feedforward neural network.

In some implementations, in generating the real-time bet package for the client device, the one or more processors are configured to generate a bet package based on a payout constraint. The payout constraint can specify a minimum payout amount.

In some implementations, in generating the real-time bet package for the client device, the one or more processors are configured to generate a bet package based on a probability of payout constraint. The probability of payout constraint can specify a minimum probability of receiving a payout.

In some implementations, in generating the real-time bet package for the client device, the one or more processors are configured to generate a bet package based on a hedged betting model. The wager request can specify a first portion of the total wager amount to be assigned to a hedging portfolio and a second portion of the total wager amount to be assigned to a risky portfolio.

At least one aspect of the present disclosure is directed to a non-transitory computer-readable medium storing computer instructions. The computer instructions when executed by one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event, the wager request comprising a total wager amount, generate a real-time bet package for the client device based on the live odds and the wager request for the horse racing event, and transmit, to the client device, the real-time bet package for display.

At least one other aspect of the present disclosure is directed to another method. The method includes iteratively identifying, by a computer system including one or more processors, live odds for a horse racing event. Each iteration can include (i) monitoring a plurality of electronic wagers submitted by a plurality of electronic devices corresponding to the horse racing event, each electronic wager identifying at least one horse and a monetary amount associated with the bet on at least one horse (ii) calculating, based on monitored data, live data comprising win odds, probables data comprising expected payouts for single event wagers, and will pays data comprising expected payouts for multi-race wagers, (iii) calculating an implied probability of winning in one or more first pools of the horse racing event based on the calculated live data, probables data, and will pays data, and (iv) calculating implied win probabilities in one or more second pools of the horse racing event for which odds or probables data isn't available. The method includes receiving, from a client device, a wager request for the horse racing event. The wager request can include a request for a betting strategy. The method includes the computer system determining a first betting strategy for the client device based on the live odds and an outcome prediction of the first betting strategy generated using a machine learning model trained using historic racing data, and transmitting, to the client device, a real-time bet package generated based on the first betting strategy for display.

In some implementations, determining the first betting strategy includes the computer system calculating, using the machine learning model and the live odds, a plurality of outcome predictions of a plurality of betting strategies, and selecting the first betting strategy from the plurality of betting strategies based on the plurality of outcome predictions. The method can include identifying the plurality of betting strategies from a set of predefined betting strategies based on at least one of one or more horses selected by the client device, one or more bet types selected by the client device, or a betting strategy type selected by the client device. Selecting the first betting strategy can include selecting a betting strategy having a highest expected payout given a level of risk specified by the client device. Selecting the first betting strategy can include ranking the plurality of strategies, and selecting a number of top ranked betting strategies. The plurality of strategies can be ranked according to at least one of corresponding expected payouts or corresponding levels of risk.

In some implementations, the machine learning model includes, for each betting strategy of a plurality of betting strategies, a corresponding decision tree model. In some implementations, the method can further include the computer system training the machine learning model using the historic racing data. The historic racing data can include actual outcomes of past races. Training the machine learning model can include partitioning, using a regression tree, the past races into a plurality of groups, each group including races sharing similar characteristics defining a corresponding race scenario. In some implementations, transmitting the real-time bet package includes transmitting the real-time bet package responsive to detecting an update of the live odds.

At least one aspect of the present disclosure is directed to a system comprising one or more processors and a memory storing executable instructions. The executable instructions when executed by the one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event. The wager request can include a request for a betting strategy. The one or more processors can determine a first betting strategy for the client device based on the live odds and an outcome prediction of the first betting strategy generated using a machine learning model trained using historic racing data, and transmit, to the client device, a real-time bet package generated based on the first betting strategy for display.

In some implementations, in determining the first betting strategy the one or more processors can calculate, using the machine learning model and the live odds, a plurality of outcome predictions of a plurality of betting strategies, and select the first betting strategy from the plurality of betting strategies based on the plurality of outcome predictions. The one or more processors can identify the plurality of betting strategies from a set of predefined betting strategies based on at least one of one or more horses selected by the client device, one or more bet types selected by the client device, or a betting strategy type selected by the client device. In selecting the first betting strategy, the one or more processors can select a betting strategy having a highest expected payout given a level of risk specified by the client device. In selecting the first betting strategy, the one or more processors can rank the plurality of strategies, and select a number of top ranked betting strategies. The plurality of strategies can be ranked according to at least one of corresponding expected payouts or corresponding levels of risk.

In some implementations, the machine learning model includes, for each betting strategy of a plurality of betting strategies, a corresponding decision tree model. In some implementations, the one or more processors can further train the machine learning model using the historic racing data. The historic racing data can include actual outcomes of past races. In training the machine learning model, the one or more processors can partition, using a regression tree, the past races into a plurality of groups, each group including races sharing similar characteristics defining a corresponding race scenario. In some implementations, in transmitting the real-time bet package the one or more processors can transmit the real-time bet package responsive to detecting an update of the live odds.

At least one aspect of the present disclosure is directed to a non-transitory computer-readable medium storing computer instructions. The computer instructions when executed by one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event. The wager request can include a request for a betting strategy. The one or more processors can determine a first betting strategy for the client device based on the live odds and an outcome prediction of the first betting strategy generated using a machine learning model trained using historic racing data, and transmit, to the client device, a real-time bet package generated based on the first betting strategy for display.

At least one other aspect of the present disclosure is directed to another method. The method includes iteratively identifying live odds for a horse racing event in real-time. Each iteration includes (i) monitoring a plurality of electronic wagers submitted by a plurality of electronic devices corresponding to the horse racing event, each electronic wager identifying at least one horse and a monetary amount associated with a bet on the at least one horse, (ii) calculating, based on monitored data, live data comprising win odds, probables data comprising expected payouts for single event wagers, and will pays data comprising expected payouts for multi-race wagers, (iii) calculating an implied probability of winning in one or more first pools of the horse racing event based on the calculated live data, probables data and will pays data, and (iv) calculating implied win probabilities in one or more second pools of the horse racing event for which odds or probables data isn't available. The method includes receiving, from a client device, a wager request for the horse racing event, the wager request comprising one or more betting constraints. The method includes the computer system generating a real-time bet package for the client device based on the live odds and the one or more betting constraints, and transmitting, to the client device, the real-time bet package for display.

In some implementations, the one or more betting constraints include a payout constraint specifying a minimum payout amount. In some implementations, the one or more betting constraints include a payout constraint specifying an expected return. In some implementations, the one or more betting constraints include a probability of payout constraint specifying a minimum payout amount. In some implementations, the one or more betting constraints include a winning likelihood constraint specifying one or more expected wining probabilities.

In some implementations, generating the real-time bet package includes the computer system optimizing one or more betting strategies subject to the one or more betting constraints, and generating the real-time bet package based on the optimized one or more betting strategies. Optimizing the one or more betting strategies can include the computer system calculating, using a machine learning model and the live odds, a plurality of outcome predictions of a plurality of betting strategies, and selecting one or more betting strategies from the plurality of betting strategies with corresponding outcome predictions satisfying the one or more betting constraints. A type of the one or more betting strategies can be selected by the client device. The machine learning model can include, for each betting strategy of a plurality of betting strategies, a corresponding decision tree model.

In some implementations, the method can include the computer system detecting a change in the live odds, calculating an updated real-time bet package based on the change in the live odds and the one or more betting constraints, and transmitting an indication of the updated real-time bet package to the client device.

At least one aspect of the present disclosure is directed to a system comprising one or more processors and a memory storing executable instructions. The executable instructions when executed by the one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event. The wager request can include one or more betting constraints. The one or more processors can generate a real-time bet package for the client device based on the live odds and the one or more betting constraints, and transmit, to the client device, the real-time bet package for display.

In some implementations, the one or more betting constraints include a payout constraint specifying a minimum payout amount. In some implementations, the one or more betting constraints include a payout constraint specifying an expected return. In some implementations, the one or more betting constraints include a probability of payout constraint specifying a minimum payout amount. In some implementations, the one or more betting constraints include a winning likelihood constraint specifying one or more expected wining probabilities.

In some implementations, in generating the real-time bet package the one or more processors can optimize one or more betting strategies subject to the one or more betting constraints, and generate the real-time bet package based on the optimized one or more betting strategies. In optimizing the one or more betting strategies the one or more processors can calculate, using a machine learning model and the live odds, a plurality of outcome predictions of a plurality of betting strategies, and select one or more betting strategies from the plurality of betting strategies with corresponding outcome predictions satisfying the one or more betting constraints. A type of the one or more betting strategies can be selected by the client device. The machine learning model can include, for each betting strategy of a plurality of betting strategies, a corresponding decision tree model.

In some implementations, the one or more processors can detect a change in the live odds, calculate an updated real-time bet package based on the change in the live odds and the one or more betting constraints, and transmit an indication of the updated real-time bet package to the client device.

At least one aspect of the present disclosure is directed to a non-transitory computer-readable medium storing computer instructions. The computer instructions when executed by one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event. The wager request can include one or more betting constraints. The one or more processors can generate a real-time bet package for the client device based on the live odds and the one or more betting constraints, and transmit, to the client device, the real-time bet package for display.

At least one other aspect of the present disclosure is directed to another method. The method includes iteratively identifying live odds for a horse racing event in real-time. Each iteration includes (i) monitoring a plurality of electronic wagers submitted by a plurality of electronic devices corresponding to the horse racing event, each electronic wager identifying at least one horse and a monetary amount associated with a bet on the at least one horse, (ii) calculating, based on monitored data, live data comprising win odds, probables data comprising expected payouts for single event wagers, and will pays data comprising expected payouts for multi-race wagers, (iii) calculating an implied probability of winning in one or more first pools of the horse racing event based on the calculated live data, probables data and will pays data, and (iv) calculating implied win probabilities in one or more second pools of the horse racing event for which odds or probables data isn't available. The method includes receiving, from a client device, a wager request for the horse racing event. The wager request can include a request for a betting strategy recommendation based on undervalued horses. The method includes calculating a real-time bet package for the client device based on the live odds of the horse racing event and estimated odds for horses participating in a race identified in the wager request, and transmitting, to the client device, the real-time bet package for display.

In some implementations, the method includes calculating, by the computer system, for each horse participating in the race identified in the wager request, corresponding estimated odds for the horse using a machine learning model trained using historic racing data. The machine learning model can include a decision tree model.

In some implementations, the method includes identifying, by the computer system, one or more horses participating in the horse racing event having live odds greater than estimated odds for the one or more horses as undervalued horses, and generating, by the computer system, the real-time bet package for the client device based on the one or more horses identified as undervalued horses. The one or more horses can be one or more first horses and the method can include detecting, by the computer system, a change in the live odds, and in response to detecting the change in the live odds, identifying, by the computer system, one or more horses second horses as undervalued horses, generating, by the computer system, a second real-time bet package for the client device based on the one or more second horses identified as undervalued horses, and transmitting, by the computer system to the client device, the second real-time bet package for display. The method can include estimating, by the computer system, an expected payout value for each horse of the one or more horses identified as undervalued horses. The method can include sorting, by the computer system, the one or more horses identified as undervalued horses based on corresponding expected payout values.

In some implementations, estimating an expected payout value for an undervalued horse includes calculating, by the computer system using a machine learning model and the live odds, a plurality of outcome predictions of a plurality of betting strategies, and determining, by the computer system, the expected payout for the undervalued horse based on the plurality of outcome predictions of the plurality of betting strategies.

In some implementations, calculating the implied win probabilities in one or more second pools includes using a machine learning model to determine payout odds for the one or more second pools. The machine learning model can include a feedforward neural network.

At least one aspect of the present disclosure is directed to a system comprising one or more processors and a memory storing executable instructions. The executable instructions when executed by the one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event. The wager request can include a request for a betting strategy recommendation based on undervalued horses. The one or more processors can calculate a real-time bet package for the client device based on the live odds of the horse racing event and estimated odds for horses participating in a race identified in the wager request, and transmit, to the client device, the real-time bet package for display.

In some implementations, the one or more processors can calculate, for each horse participating in the race identified in the wager request, corresponding estimated odds for the horse using a machine learning model trained using historic racing data. The machine learning model can include a decision tree model.

In some implementations, the one or more processors can identify one or more horses participating in the horse racing event having live odds greater than estimated odds for the one or more horses as undervalued horses, and generate the real-time bet package for the client device based on the one or more horses identified as undervalued horses. The one or more horses can be one or more first horses and the one or more processors can detect a change in the live odds, and in response to detecting the change in the live odds, identify one or more horses second horses as undervalued horses, generate a second real-time bet package for the client device based on the one or more second horses identified as undervalued horses, and transmit, to the client device, the second real-time bet package for display. The one or more processors can estimate an expected payout value for each horse of the one or more horses identified as undervalued horses. The one or more processors can sort the one or more horses identified as undervalued horses based on corresponding expected payout values.

In some implementations, in estimating an expected payout value for an undervalued horse the one or more processors can calculate, using a machine learning model and the live odds, a plurality of outcome predictions of a plurality of betting strategies, and determine the expected payout for the undervalued horse based on the plurality of outcome predictions of the plurality of betting strategies.

In some implementations, in calculating the implied win probabilities in one or more second pools one or more processors can use a machine learning model to determine payout odds for the one or more second pools. The machine learning model can include a feedforward neural network.

At least one aspect of the present disclosure is directed to a non-transitory computer-readable medium storing computer instructions. The computer instructions when executed by one or more processors cause the one or more processors to iteratively identify live odds for a horse racing event. In each iteration, the one or more processors (i) monitor a plurality of electronic wagers submitted by a plurality of electronic devices corresponding to the horse racing event, each electronic wager identifying at least one horse and a monetary amount associated with a bet on the at least one horse, (ii) calculate, based on monitored data, live data comprising win odds, probables data comprising expected payouts for single event wagers, and will pays data comprising expected payouts for multi-race wagers, (iii) calculate an implied probability of winning in one or more first pools of the horse racing event based on the calculated live data, probables data, and will pays data, and (iv) calculate implied win probabilities in one or more second pools of the horse racing event for which odds or probables data is not available. The one or more processors can receive, from a client device, a wager request for the horse racing event. The wager request can include a request for a betting strategy recommendation based on undervalued horses. The one or more processors can calculate a real-time bet package for the client device based on the live odds of the horse racing event and estimated odds for horses participating in a race identified in the wager request, and transmit, to the client device, the real-time bet package for display.

At least one other aspect of the present disclosure is directed to yet another method. The method includes constructing in real time a set of bets implementing a certain betting strategy. Each strategy can constitute a betting heuristic, such as a hedge on win, place, show or a combination of pools, a set of bets on simple and exotic wagers (with various weights assigned to each). The method can be performed to calculate a certain number of possible betting combinations, or to implement a common wagering pattern, such as betting on a combination of favorite horses and long shot horses. With each iteration, the processor monitors a plurality of electronic wagers submitted by a plurality of electronic devices corresponding to the horse racing event. Each electronic wager can identify at least one horse and a monetary amount associated with the bet on at least one horse. With each iteration, the processor calculates the implied probability of winning of a horse or a combination of horses (in exact order of finish) in the horse racing event, based on live data, which may include win odds, probables (expected payouts for single event wagers adjusted (or unadjusted) for takeout), and will pays (expected payouts for multi-race wagers, adjusted (or unadjusted) for takeout). With each iteration, the processor calculates implied win probabilities of a horse or a combination of horses in a horse racing event for which odds or probables data is not available, such as for Trifecta and Superfecta pools. The method includes receiving, from a client device, a wager request for the horse racing event, the wager request comprising a total wager amount. The method includes calculating a real-time bet package for the client device based on live odds and the wager request for the horse racing event. The method includes transmitting, to the client device, the real-time bet package for display on the client device.

In some implementations, the method includes detecting a change in the real-time bet package. In some implementations, the method includes calculating an updated bet package based on the change in live odds and the total wager amount. In some implementations, the method includes transmitting, to the client device, a notification including the updated bet package.

At least one aspect of the present disclosure is directed to yet another method. The method can be performed, for example, by a processor. The method includes receiving a request for a betting package for the horse racing event. The request can include a risk tolerance value, or a target expected payout or a different constraint. The method includes determining bet packages based on the constraint-optimized strategies meeting the criteria specified. With each iteration, the processor monitors a plurality of electronic wagers submitted by a plurality of electronic devices corresponding to the horse racing event. Each electronic wager can identify at least one horse and a monetary amount associated with the bet on at least one horse. With each iteration, the method calculates the implied probability of winning of a horse or a combination of horses (in exact order of finish) in the horse racing event, based on live data, which may include win odds, probables (expected payouts for single event wagers adjusted (or unadjusted) for takeout), will pays (expected payouts for multi-race wagers, adjusted (or unadjusted) for takeout). With each iteration, the processor calculates implied win probabilities of a horse or a combination of horses in a horse racing event for which odds or probables data isn't available, such as for Trifecta and Superfecta pools. The method includes receiving, from a client device, a wager request for the horse racing event, the wager request comprising a constraint, such as a risk tolerance value or a target expected payout. The method includes calculating a real-time bet package for the client device based on live odds and the wager request for the horse racing event. The method includes transmitting, to the client device, the real-time bet package for display on the client device.

In some implementations, the method includes generating the scenario model based on a class of historic horse racing events, a set of racetrack identifiers of the historic horse racing events, a set of identifiers of horses that participated in the historic horse racing events, and outcome data of the historic horse racing events. In some implementations, the method includes detecting a change in the real-time bet package. In some implementations, the method includes calculating an updated bet package based on the change in live odds and the total wager amount. In some implementations, the method includes transmitting a notification including the updated bet package.

At least one aspect of the present disclosure is directed to yet another method. The method includes receiving a request for a betting strategy recommendation based on the success rate of a betting strategy on historical events sharing the same characteristics as the current event by determining the recommended betting strategies and betting packages based on these recommended strategies meeting the criteria specified. With each iteration, the processor monitors a plurality of electronic wagers submitted by a plurality of electronic devices corresponding to the horse racing event. Each electronic wager can identify at least one horse and a monetary amount associated with the bet on at least one horse. With each iteration, the processor calculates the implied probability of winning of a horse or a combination of horses (in exact order of finish) in the horse racing event, based on live data, which may include win odds, probables (expected payouts for single event wagers adjusted (or unadjusted) for takeout), will pays (expected payouts for multi-race wagers, adjusted (or unadjusted) for takeout). With each iteration, the processor calculates implied win probabilities of a horse or a combination of horses in a horse racing event for which odds or probables data isn't available, such as for Trifecta and Superfecta pools. The method includes receiving, by the processor, from a client device, a wager request for the horse racing event, the wager request comprising a constraint, such as a risk tolerance value or a target expected payout. The method includes calculating a real-time bet package for the client device based on live odds and the wager request for the horse racing event. The method includes transmitting, to the client device, the real-time bet package for display on the client device.

In some implementations, the method includes generating the scenario model based on a class of historic horse racing events, a set of racetrack identifiers of the historic horse racing events, a set of identifiers of horses that participated in the historic horse racing events, and outcome data of the historic horse racing events. In some implementations, the method includes detecting a change in the real-time bet package. In some implementations, the method includes calculating an updated bet package based on the change in live odds and the total wager amount. In some implementations, the method includes transmitting, to the client device, a notification including the updated bet package.

At least one aspect of the present disclosure is directed to yet another method. The method includes iteratively identifying, in real time, undervalued bets (or a combination of bets) based on the difference between estimated odds (or implied real probabilities of a horse racing event) provided by a client or a machine learning algorithm and live odds of the horse racing event. In each iteration the processor can monitor the data received from the third party system in a horse racing event. With each iteration, the processor monitors a plurality of electronic wagers submitted by a plurality of electronic devices corresponding to the horse racing event. Each electronic wager can identify at least one horse and a monetary amount associated with the bet on at least one horse. With each iteration, the processor calculates the implied probability of winning of a horse or a combination of horses (in exact order of finish) in the horse racing event, based on live data, which may include win odds, probables (expected payouts for single event wagers adjusted (or unadjusted) for takeout), or will pays (expected payouts for multi-race wagers, adjusted (or unadjusted) for takeout). With each iteration, the processor calculates implied win probabilities of a horse or a combination of horses in a horse racing event for which odds or probables data isn't available, such as typical for Trifecta and Superfecta pools. The method includes receiving, from a client device, a wager request for the horse racing event, the wager request comprising a request for a betting strategy recommendation based on undervalued horses. The method includes calculating a real-time bet package for the client device based on live odds and providing a recommendation based on the difference between estimated and live odds. The method includes transmitting, to the client device, the real-time bet package for display on the client device.

In some implementations, determining the wager recommendation for the horse racing event includes identifying a horse participating in the horse racing event that has live odds that is less than the estimated odds value for the horse. In some implementations, determining the wager recommendation for the horse racing event includes generating the wager recommendation as including an identifier of the horse having live odds that is less than the estimated odds value and corresponding recommended bet amount.

At least one aspect of the present disclosure is directed to a method. The method can be performed by a processor in real-time. The method can include iteratively calculating, in real-time, the implied probability of a horse winning or a combination of horses (in exact order of finish) in a horse racing event, based on live data, which may include win odds, probables (expected payouts for single event wagers adjusted (or unadjusted) for takeout), or will pays (expected payouts for multi-race wagers, adjusted (or unadjusted) for takeout). In each iteration, the processor can monitor the data received corresponding to the horse racing event. The method can include receiving data from a third party data source, which may include a continuous stream of data from a computer system (bet totalizator or a similar system) or periodically updated data entered by a human or transmitted via batch by a batch-based computer system. The method can include transmitting and receiving data, by the processor, to and from the third party system, in synchronous or asynchronous communication patterns.

At least one other aspect of the present disclosure is directed to a method. The method can be performed, for example, by a processor in real-time. The method can include iteratively calculating, in real time, implied win probabilities of a horse or a combination of horses in a horse racing event for which odds or probables data isn't available, such as typical for Trifecta and Superfecta pools. The method can include using mathematical models to estimate the implied win probabilities of horse betting combinations in the horse racing event.

At least one other aspect of the present disclosure is directed to method. The method can be performed, for example, by a processor in real-time. The method can include constructing in real time a set of bets implementing a certain betting strategy. Each strategy can constitute a betting heuristic, such as a hedge on win, place, show or a combination of pools, a set of bets on simple and exotic wagers (with various weights assigned to each), a method covering a certain number of possible betting combinations, or a method implementing a common wagering pattern, such as betting on a combination of favorite horses and long shot horses.

In some implementations, the method can include detecting a change in recommended bets comprising an initial bet package. In some implementations, the method can include calculating an updated bet package based on the change in live odds or the total wager amount. In each iteration, the processor can update recommended bets in a bet package on each cycle defined as a set of the new wagering data received from the third party system in a horse racing event. In some implementations, the method can include transmitting, to the client device, a notification including the updated bet package.

The method can include receiving, from a client device, a request for a betting package for the horse racing event, the request comprising a risk tolerance value, or a target expected payout or a different constraint. The method can include determining the constraint-optimized strategies and bet packages based on these constraint-optimized strategies meeting the criteria specified by the client device. The method can include transmitting, to the client device, the resulting bet package for display at the client device prior to the start time of the horse racing event.

The method can include receiving, from a client device, a request for a betting strategy recommendation based on success rate of a betting strategy on historical races sharing the same characteristics as the current race. The method can include determining the recommended strategies and bet packages based on these recommended strategies meeting the criteria specified by the client device. The method can include transmitting, to the client device, the resulting bet package for display at the client device prior to the start time of the horse racing event.

At least one other aspect of the present disclosure is directed to a method. The method can be performed, for example, by a processor in real-time. The method can include iteratively identifying, in real time, undervalued bets (or a combination of bets) based on the difference between the estimated odds (or implied real probabilities of a horse racing event) provided by a client or a machine learning algorithm and live odds of the horse racing event. In each iteration the processor can monitor the data received from the third party system in the horse racing event. In each iteration the processor can use supplied estimated odds to calculate the divergence from live odds and compute a set of simple or exotic wagers which meet the criteria of undervalued bets. In each iteration the processor can revise the set of bets and wagering amounts, when live odds for at least one horse has become different from the estimated odds. The method can include receiving, from a client device, a request for a bet package based on undervalued bet combinations. The method can include selecting a recommended set of bets based on the difference in value from the calculated and live values. The method can include transmitting, to the client device, the recommended bet package for display at the client device prior to the start time of the horse racing event.

At least one aspect of the present disclosure is directed to a method. The method can be performed by a processor in real-time. The method can include iteratively calculating, in real-time, real-time odds values based on attributes of a horse racing event and an initial odds value for each horse within the horse racing event. In each iteration, the processor can monitor a plurality of electronic wagers submitted by a plurality of electronic devices corresponding to the horse racing event. Each electronic wager can identify at least one horse and a monetary amount associated with the at least one horse. In each iteration, the processor can execute an artificial intelligence model to calculate a revised odds value for each horse within the horse racing event based on the plurality of electronic wagers. In each iteration, the processor can revise the real-time odds values responsive to at least one revised odds value being different than the initial odds value. The method can include receiving, from a client device, a wager request for the horse racing event, the wager request comprising a total wager amount. The method can include calculating a real-time bet package for the client device based on the real-time odds values and the wager request for the horse racing event. The method can include transmitting, by the processor to the client device, responsive to detecting a revision to the initial real-time odds values, the real-time bet package for display on the client device.

In some implementations, monitoring the plurality of electronic wagers can include receiving a plurality of wager requests from the plurality of electronic devices prior to a start time of the horse racing event. In some implementations, monitoring the plurality of electronic wagers can include calculating a pari-mutuel bet pool based on the plurality of wager requests and the attributes of the horse racing event. In some implementations, monitoring the plurality of electronic wagers can include revising the real-time odds values further based on the pari-mutuel bet pool.

In some implementations, the method can include detecting a change in the initial bet package. In some implementations, the method can include calculating an updated bet package based on the change in the initial bet package and the total wager amount. In some implementations, the method can include transmitting, to the client device, a notification including the updated bet package.

At least one other aspect of the present disclosure is directed to method. The method can be performed, for example, by a processor in real-time. The method can include iteratively calculating, in real time, real-time odds values of a horse racing event based on attributes of the horse racing event and an initial odds value for each horse of the horse racing event. In each iteration, the processor can monitor a plurality of electronic wagers submitted by a plurality of electronic devices corresponding to the horse racing event. Each electronic wager can identify at least one horse and a monetary amount associated with the at least one horse. In each iteration, the processor can execute an artificial intelligence model to calculate a revised odds value for each horse within the horse racing event based on the plurality of electronic wagers. In each iteration, the processor can revise the real-time odds values when at least one revised odds value is different than the initial odds value. The method can include receiving, from a client device, a request for a betting strategy for the horse racing event. The method can include calculating, using a scenario model, a plurality of scenario outcomes of the horse racing event based on the real-time odds values. The method can include selecting an optimal scenario from the plurality of scenario outcomes. The method can include transmitting, to the client device, responsive to detecting a revision to the real-time odds values, the optimal scenario for display at the client device prior to a start time of the horse racing event.

In some implementations, the method can include generating the scenario model based on a class of historic horse racing events, a set of racetrack identifiers of the historic horse racing events, a set of identifiers of horses that participated in the historic horse racing events, and outcome data of the historic horse racing events. In some implementations, the method can include selecting a second optimal scenario from the plurality of scenario outcomes. In some implementations, the method can include generating a bet package using the optimal scenario and the second optimal scenario. In some implementations, the method can include presenting the bet package on a display of the client device prior to the start time of the horse racing event.

At least one other aspect of the present disclosure is directed to a method. The method can be performed, for example, by a processor in real-time. The method can include iteratively calculating, in real time, real-time odds values of a horse racing event based on attributes of the horse racing event and an initial odds value for each horse of the horse racing event. In each iteration the processor can monitors a plurality of electronic wagers submitted by a plurality of electronic devices corresponding to the horse racing event. Each electronic wager can identify at least one horse and a monetary amount associated with the at least one horse. In each iteration the processor can execute an artificial intelligence model to calculate a revised odds value for each horse within the horse racing event based on the plurality of electronic wagers. In each iteration the processor can revise the real-time odds values when at least one revised odds value is different than the initial odds value. The method can include receiving, from a client device, a request for a betting package for the horse racing event, the request comprising a risk tolerance value. The method can include calculating, using a scenario model, a plurality of scenario outcomes for the horse racing event based on the attributes of the horse racing event, the real-time odds values, and the risk tolerance value. The method can include selecting an optimal scenario from the plurality of scenario outcomes based on the risk tolerance value. The method can include transmitting, to the client device, responsive to detecting a revision to the real-time odds values, the optimal scenario for display at the client device prior to a start time of the horse racing event.

In some implementations, estimating the plurality of scenario outcomes can include identifying a plurality of betting combinations for the horse racing event based on the attributes of the horse racing event. In some implementations, estimating the plurality of scenario outcomes can include calculating the plurality of scenario outcomes for a subset of the plurality of betting combinations using the scenario model and the real-time odds values.

In some implementations, the attributes of the horse racing event comprise a plurality of identifiers of horses participating in the horse racing event. In some implementations, calculating the plurality of scenario outcomes includes selecting the subset of the plurality of betting combinations based on the real-time odds values and the plurality of identifiers of horses participating in the horse racing event.

At least one other aspect of the present disclosure is directed to a method. The method can be performed, for example, by a processor in real-time. The method can include iteratively calculating, in real time, real-time odds values of a horse racing event based on attributes of the horse racing event and an initial odds value for each horse of the horse racing event. In each iteration, the processor can monitor a plurality of electronic wagers submitted by a plurality of electronic devices corresponding to the horse racing event. Each electronic wager can identify at least one horse and a monetary amount associated with the at least one horse. In each iteration, the processor can execute an artificial intelligence model to calculate a revised odds value for each horse within the horse racing event based on the plurality of electronic wagers. In each iteration, the processor can revise the real-time odds values when at least one revised odds value is different than the initial odds value. The method can include receiving, from a client device, a request for a wager recommendation for the horse racing event. The method can include estimating, using an odds estimation model, an estimated odds value for each horse participating in the horse racing event. The method can include determining the wager recommendation for the horse racing event based on a difference between the real-time odds values for the horse racing event and the estimated odds value for each horse participating in the horse racing event. The method can include transmitting, to the client device, responsive to detecting a revision to the real-time odds values, the wager recommendation for the horse racing event for display at the client device prior to a start time of the horse racing event.

In some implementations, the method can include generating the odds estimation model based on historical outcome data for a plurality of past horse racing events and attributes of each horse that participated in the plurality of past horse racing events. In some implementations, determining the wager recommendation for the horse racing event can include identifying a horse participating in the horse racing event that has a real-time odds value that is less than the estimated odds value for the horse. In some implementations, determining the wager recommendation for the horse racing event can include generating the wager recommendation as including an identifier of the horse having the real-time odds value that is less than the estimated odds value.

At least one other aspect of the present disclosure is directed to a method. The method can be performed, for example, by a processor in real-time. The method can include iteratively calculating, in real time, real-time odds values of a horse racing event based on attributes of the horse racing event and an initial odds value for each horse of the horse racing event. The horse racing event can have a class for which historical outcome data is unavailable. In each iteration, the processor can monitor a plurality of electronic wagers submitted by a plurality of electronic devices corresponding to the horse racing event. Each electronic wager identifying at least one horse and a monetary amount associated with the at least one horse. In each iteration, the processor can execute an artificial intelligence model to calculate a revised odds value for each horse within the horse racing event based on the plurality of electronic wagers. In each iteration, the processor can revise the real-time odds values when at least one revised odds value is different than the initial odds value. The method can include receiving, from a client device, a request for a horse recommendation for the horse racing event. The method can include calculating, using a prediction model, outcome data for a plurality of horses participating in the horse racing event based on attributes of each of the plurality of horses and the real-time odds values. The method can include selecting a recommended horse of the plurality of horses participating in the horse racing event based on the outcome data. The method can include transmitting, to the client device, responsive to detecting a revision to the real-time odds values, the recommended horse for display at the client device prior to a start time of the horse racing event.

In some implementations, calculating the outcome data for the plurality of horses is further based on the class of the horse racing event. In some implementations, the request for the horse recommendation further comprises a risk tolerance value. In some implementations, selecting the recommended entity is further based on the risk tolerance value.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

Non-limiting embodiments of the present disclosure are described by way of example with reference to the accompanying figures, which are schematic and are not intended to be drawn to scale. For purposes of clarity, not every component may be labeled in every drawing. Unless indicated as representing the background art, the figures represent aspects of the disclosure. In the drawings.

DETAILED DESCRIPTION

Figure 1:
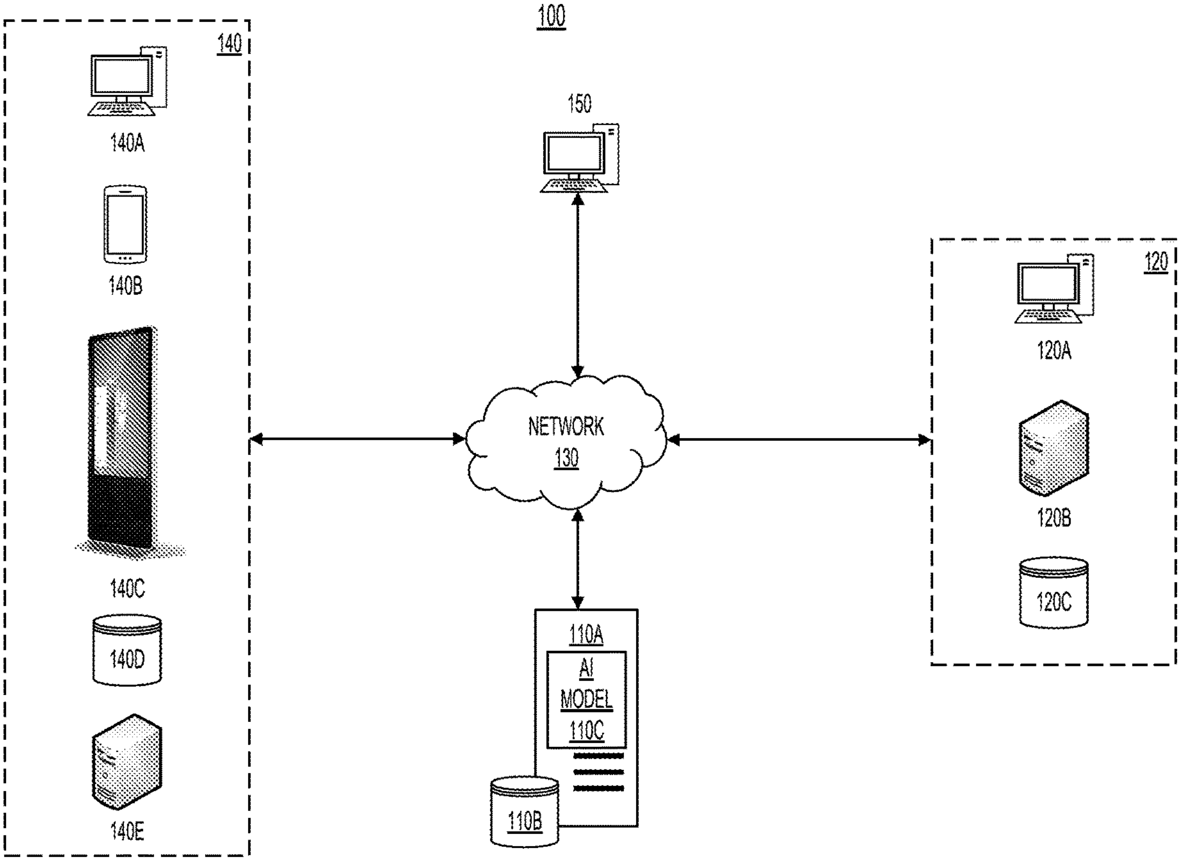
FIG. 1 illustrates components of a real-time horse race wager processing system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a non-limiting example of components of a system in which the wager processing server operates. FIG. 1 illustrates components of a system 100. The system 100 may include a wager processing server 110A, a system database 110B, electronic data sources 120A-C (collectively electronic data sources 120), end-user devices 140A-E (collectively end-user devices 140), and an administrator computing device 150. The above-mentioned components may be connected to each other through a network 130. Examples of the network 130 may include, but are not limited to, private or public LAN, WLAN, MAN, WAN, and the Internet. The network 130 may include wired and/or wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, for example, a GSM (Global System for Mobile Communications), CDMA (Code Division Multiple Access), or an EDGE (Enhanced Data for Global Evolution) network. The network 130 can include any of the structure or functionality of the network 204 described herein below in connection with FIG. 2A.

The system 100 is not confined to the components described herein and may include additional or other components, not shown for brevity, which are to be considered within the scope of the embodiments described herein. The wager processing server 110A and/or the system database 110B can be or can include any of the functionality or structure of, the servers 206 described herein in connection with FIGS. 2A-2B. For example, the wager processing server 110A and/or the system database 110B can form a part of a cloud, such as the cloud 208 described herein in connection with FIG. 1B. Likewise, any of the end-user devices 140 or the electronic data sources 120 can be, or including any of the functionality or structure of, the clients 202 described herein in connection with FIGS. 2A-2B.

The wager processing server 110A can maintain and execute various computer models, including mathematical and machine learning models such as the model 110C. The system 100 can include graphical user interfaces (GUI) displayed on each electronic data source 120, the end-user devices 140, and/or the administrator computing device 150. An example of the electronic platform generated and hosted by the wager processing server 110A may be a web-based application or a website configured to be displayed on different electronic devices, such as mobile devices, tablets, personal computers, and the like. In some implementations, the web-based application can include one or more application functionalities that are executed by the wager processing server as described herein, the results of which can be transmitted to one or more of the electronic data sources 120, the end-user devices 140, and/or the administrator computing device 150 for display in a web-browser environment or in a native application. Non-limiting examples of native applications can include mobile applications installed from one or more mobile application providers or stores.

In a non-limiting example, a racetrack third party data provider operating one or more of the electronic data sources 120 can provide information relating to upcoming horse racing events, such as identifiers of horses participating in the events, live odds, probables and will pays, among others. The wager processing server 110A can receive the data from the data sources, calculate implied probabilities for horses participating in a race, calculate probabilities and payouts for pools information for which is not available, detect changes in live odds, perform techniques for rebalancing bet portfolios by balancing payouts and risk, recommending bets on undervalued horses as described in greater detail herein below in connection with FIGS. 3, 4, 5 and 6, respectively.

In addition, the betting providers operating one or more of the electronic data sources 120 can collect wager information from users that place wagers on horse races, for example, from users that place bets at a horse racetrack or from other similar providers. The betting providers operating one or more of the electronic data sources 120 can further provide other wager information about horse races, such as the total amount of money that has been bet on each horse in an upcoming horse race. The providers of one or more of the electronic data sources 120 can thus receive bets from external users or electronic devices that may not be in direct communication with the wager processing server 110A.

The electronic data sources 120 can transmit this information to the wager processing server 110A, for example, when bets are received by the operators of the electronic data sources 120. The wager processing server 110A can further make requests to the electronic data sources 120 at predetermined intervals to request updated wager information over time. In addition, the wager processing server 110A can receive wager requests from the end-user devices 140, which can provide wager requests including wager amounts, identifiers of one or more horses and corresponding wager amounts assigned to each horse, risk tolerance or expected payout, estimated odds and other information. The wager processing server 110A can store the wager information in the system database 110B in association with the horse racing event. The wagering information can be used in the wager processing techniques described herein and to build and maintain a database of historic racing outcome information.

Generally, the wager processing server 110A can receive horse racing event attributes from the electronic data sources 120, one or more of which can be operated by entities responsible for maintaining or updating information relating to upcoming and past horse racing events. As described herein, horse racing event attributes can be or can include any attributes related to a horse race or any horses participating in the horse races. Horse racing event attributes can include, but are not limited to, the start time of a horse racing event, the distance of a horse racing event, attributes of horses participating in a horse racing event, the number of horses participating in a horse racing event, or an amount of money that has been bet on each horse in a horse racing event.

The wager processing server 110A may host a website accessible to users operating any of the electronic devices described herein (e.g., end-users), where the content presented via the various webpages may be controlled based upon the roles and/or viewing permissions of each user. The wager processing server 110A may be any computing device comprising a processor and non-transitory machine-readable storage capable of executing the various tasks and processes described herein. Non-limiting examples of such computing devices may include workstation computers, laptop computers, server computers, and the like. While the system 100 includes a single wager processing server 110A, the wager processing server 110A may include any number of computing devices operating in a distributed computing environment, such as a cloud environment (e.g., the cloud 208 described herein in connection with FIG. 1B).

The wager processing server 110A may execute software applications configured to display the electronic platform (e.g., host a website), which may generate and serve various webpages to each electronic data source 120 and/or end-user devices 140. Different users may use the website to view and/or interact with predicted/computed results. In addition, the wager processing server 110A can provide information for display in native applications executing on each electronic data source and/or end-user devices 140, for example, in the form of an application resource in response to a request for information, in the form of a push notification or other type of notification, or in the form of another type of message, such as an email, a text message (e.g., via a short-message-system (SMS) protocol), or another type of electronic message.

The wager processing server 110A may be configured to require user authentication based upon a set of user authorization credentials (e.g., username, password, biometrics, cryptographic certificate, and the like). The wager processing server 110A may access the system database 110B configured to store user credentials, which the wager processing server 110A may be configured to reference in order to determine whether a set of entered credentials (purportedly authenticating the user) match an appropriate set of credentials that identify and authenticate the user. In some implementations, each set of user credentials can authorize a user to access a profile created in part by and associated with the user. The profile associated with the user can store attributes of a user, which can include but is not limited to user risk tolerance values, previous or current wagers and any information associated therewith, previous or current horse races on which wagers have been placed, previous or current horses on which wagers have been placed, and any other user information. The user information can be provided, for example, from an end-user device 140 during account creation, or through other communications with the wager processing server 110A.

The wager processing server 110A may also store data associated with each user operating one or more electronic data sources 120 and/or end-user devices 140. The wager processing server 110A may use the data to rebalance bet portfolios.

The wager processing server 110A may generate and host webpages based upon a particular user's role within the system 100. In such implementations, the user's role may be defined by data fields and input fields in user records stored in the system database 110B. The wager processing server 110A may authenticate the user and may identify the user's role by executing an access directory protocol (e.g., LDAP). The wager processing server 110A may generate webpage content (or native application content) that is customized according to the user's role defined by the user record in the system database 110B.

The wager processing server 110A can receive wager requests from end-user devices 140, calculate initial and revised bet packages or wagers based on data received from third parties in real-time, and calculate a real-time bet package for the end-user device 140, and transmit the real-time bet package in response to detecting a revision to live odds. For instance, in a non-limiting example, the wager processing server 110 can query and retrieve live odds information, from one or more of the electronic data sources 120. When new race-related information is received, the wager processing server 110A can revise a real-time bet package for a user and transmit the revised bet package to the end-user device 140. In some implementations, the bet packages can be transmitted to the administrator computing device 150 for display.

The electronic data sources 120 may represent various electronic data sources that contain, retrieve, and/or input data associated with horse races and wager information (e.g., any of the horse race attributes described herein, real-time wagers placed on a horse racing event). For instance, the wager processing server 110A may use the horse race computer 120A, horse race server 120B (associated with one or more horse racetracks or betting provider), and database 120C (associated with one or more horse racetracks or betting provider) to retrieve/receive real-time wager or horse racing attribute data associated with a one or more upcoming racing events. The electronic data sources can include any of the functionality or structure of the computing device 200 described herein in connection with FIGS. 2C-2D.

End-user devices 140 may be any computing device comprising a processor and a non-transitory machine-readable storage medium capable of performing the various tasks and processes described herein. For example, the end-user device 140 can include any of the functionality or structure of the computing device 200 described herein in connection with FIGS. 2C-2D. Non-limiting examples of an end-user device 140 may be a workstation computer, laptop computer, tablet computer, and server computer. In some implementations, an end-user device 140 can be a kiosk device, which includes one or more computing devices in communication with a display device. The kiosk device can be positioned, for example, at a racetrack and be available for one or more bets placed on horse racing events at the racetrack. In operation, various users may use end-user devices 140 to access the GUI operationally managed by or including information provided from the wager processing server 110A. Specifically, the end-user devices 140 may include a computer 140A, a mobile device 140B, a kiosk 140C, a database 140D, and a server device 140E.

The administrator computing device 150 may represent a computing device operated by a system administrator. The administrator computing device 150 may be configured to display data retrieved or any wager, strategy, or recommendation information generated by the wager processing server 110A, such that the system administrator can monitor various models utilized by the wager processing server 110A, electronic data sources 120, and/or end-user devices 140; review feedback; and/or facilitate the validation/calibration of machine learning and mathematical optimization models that are maintained by the wager processing server 110A.

In operation, a betting provider can access an application executing on an electronic data source 120 and input betting information (e.g., information relating to an upcoming horse race, including participating horses, morning line odds, racetrack condition information, horse race start time, horse race duration, or any other horse racing event attributes). The wager processing server 110A can use identifiers of upcoming horse racing events, for example, to query information relating to upcoming horse racing events from the electronic data sources 120. The wager processing server 110A may then utilize the systems and methods described herein to rebalance bet portfolios. The results from one or more of these techniques can then be transmitted to one or more of the end-user devices 140, for example, in response to a respective request corresponding to a processing technique as described herein.

For example, the wager processing server 110A may be in communication (real-time or near real-time) with the end-user devices 140. The end-user devices 140 can access a web-based interface, such as a website, provided directly or indirectly by the wager processing system. In some implementations, an end-user device 140 can execute a native application that is associated with and communicates with the wager processing server 110A to perform the operations described herein. The end-user devices 140 can transmit one or more processing techniques to the wager processing server 110A, including one or more of a request for rebalancing bet portfolios (e.g., a real-time bet package), balancing betting strategies based on scenario outcomes (e.g., a request for a betting strategy for a horse racing event), balancing payouts and risk (e.g., a request for a strategy given a particular risk tolerance value or expected payout), and determining overlay opportunities (e.g., a request to scan for undervalued bet combinations).

For instance, the wager processing server 110A may execute one or more mathematical models that can be used to calculate implied win probabilities for horses based on live odds that are monitored for a horse racing event in real-time. The wager processing server 110A can iteratively calculate implied probabilities and payouts for bets for which this data is not available, by monitoring electronic wagers received from the end-user devices 140 or the electronic data sources 120 (e.g., which may receive bets from other devices, or from in-person bets at a racetrack). Using a mathematical optimization model, the wager processing server 110A can calculate and balance a real-time bet profile for a requesting end-user deice 140.

In addition, the wager processing server 110*a* can recommend betting opportunities, or adjust weights of bets, based on overlays (undervalued bets). The wager processing server 110A can do so by comparing implied probabilities of horses estimated by the user to identify horses that may be undervalued. These undervalued horses can be used to weight or otherwise recommend betting options for an end-user device 140. In addition, the wager processing server 110A can utilize data from a prediction model (e.g., an artificial intelligence or machine learning model) or user-estimated real odds to weight or otherwise recommend betting options for an end-user device 140 based on the difference in real and live odds. The results of any or all these processing techniques can be provided for display on the end-user device 140 or the administer device 150.

The methods described herein for real-time horse race wager processing, including techniques for rebalancing bet portfolios and scanning for and recommending undervalued bets, may be implemented using the networking and computing environments described below in connection with FIGS. 2A-2D.

Figure 2A:
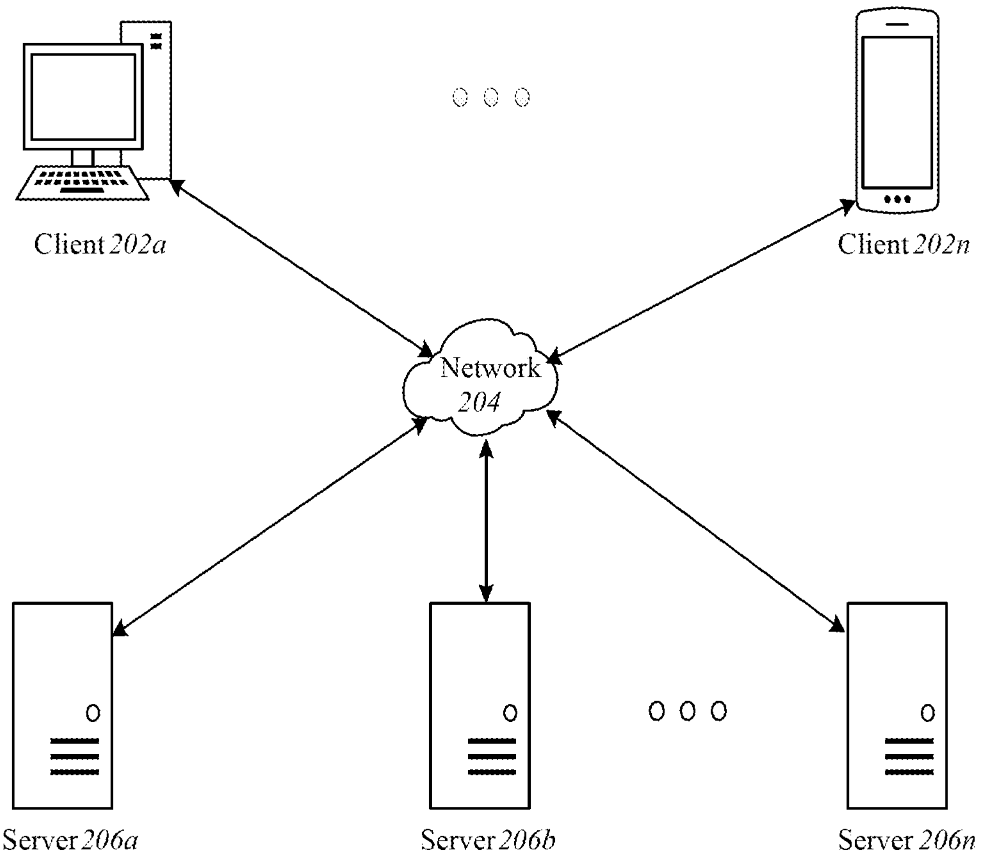
FIG. 2A is a block diagram depicting a network environment comprising client devices in communication with a server device, according to an embodiment.

Referring to FIG. 2A, an embodiment of a network environment. In brief overview, the network environment includes one or more client devices 202*a*-202*n* (also generally referred to as client device(s) 202) in communication with one or more servers 206*a*-206*n* (also generally referred to as server(s) 206) via one or more networks 204. In some embodiments, a client device 202 has the capacity to function as both a client node seeking access to resources provided by a server and as a server providing access to hosted resources for other client devices 202*a*-202*n*.

The network 204 may be connected via wired or wireless links. Wired links may include Digital Subscriber Line (DSL), coaxial cable lines, or optical fiber lines. The wireless links may include Wi-Fi, Worldwide Interoperability for Microwave Access (WiMAX), an infrared channel, or a satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification.

The network 204 may be any type and/or form of network. The geographical scope of the network 204 may vary widely and the network 204 can be a body area network (BAN), a personal area network (PAN), a local-area network (LAN), e.g. Intranet, a metropolitan area network (MAN), a wide area network (WAN), or the Internet. The topology of the network 204 may be of any form and may include, a point-to-point topology, a bus topology, a star topology, a ring topology, a mesh topology, or a tree topology, or a combination thereof. The network 204 may be of any such network topology as known to those ordinarily skilled in the art capable of supporting the operations described herein. The network 204 may utilize different techniques and layers or stacks of protocols, including, for example, the Ethernet protocol, the internet protocol suite (TCP/IP), the ATM (Asynchronous Transfer Mode) technique, the Synchronous Optical Networking (SONET) protocol, or the Synchronous Digital Hierarchy (SDH) protocol. The TCP/IP internet protocol suite may include application layer, transport layer, internet layer (including, e.g., IPv6), or the link layer. The network 204 may be a type of a broadcast network, a telecommunications network, a data communication network, or a computer network.

Each server 206 may be a file server, application server, web server, proxy server, appliance, network appliance, gateway, gateway server, virtualization server, deployment server, SSL VPN server, or firewall. In one embodiment, the server 206 may be referred to as a remote machine or a node. In another embodiment, a plurality of nodes may be in the path between any two communicating servers. As described herein, one or more of the servers 206 can perform any of the functionalities of the wager processing server 110A described herein in connection with FIG. 1.

Figure 2B:
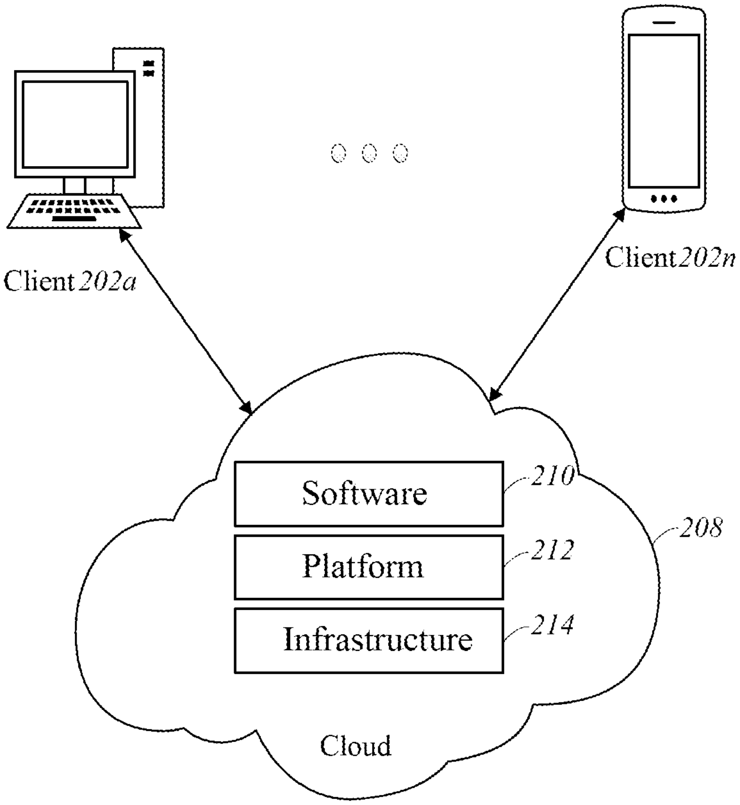
FIG. 2B is a block diagram depicting a cloud computing environment comprising client devices in communication with cloud service providers, according to an embodiment.

Referring to FIG. 2B, a cloud computing environment is depicted. A cloud computing environment may provide client devices 202 with one or more resources provided by a network environment. The cloud computing environment may include one or more client devices 202*a*-202*n* in communication with the cloud 208 over one or more networks 204. The cloud 208 may include back-end platforms, including one or more servers 206, additional storage, server farms, or data centers. The cloud 208 may be public, private, or hybrid. Public clouds may include public servers 206 that are maintained by third parties to the client devices 202 or the owners of the clients. The servers 206 may be located off-site in remote geographical locations as disclosed above or otherwise. Public clouds may be connected to the servers 206 over a public network. Private clouds may include private servers 206 that are physically maintained by client devices 202 or owners of clients. Private clouds may be connected to the servers 206 over a private network 204. Hybrid clouds 208 may include both the private and public networks 204 and servers 206.

The cloud 208 may also include a cloud-based delivery of application resources of other computing resources, including Software as a Service (SaaS) 210, Platform as a Service (PaaS) 212, and Infrastructure as a Service (IaaS) 214. IaaS 214 may refer to a user renting the use of infrastructure resources that are needed during a specified period. IaaS providers may offer storage, networking, servers, or virtualization resources from large pools, allowing the users to quickly scale up by accessing more resources as needed. PaaS 212 providers may offer functionality provided by IaaS 214, including, e.g., storage, networking, servers or virtualization, as well as additional resources such as, an operating system, middleware, or runtime resources. SaaS 210 providers may offer the resources that PaaS 212 provides, including storage, networking, servers (e.g., the servers 206, the wager processing server 110A), operating systems, middleware, or runtime resources. The functionalities of the wager processing server 110A can be executed on the servers 206 present in the cloud 208 and may be operated as part of a SaaS 210, a PaaS 212, or an IaaS 214 arrangement of cloud 208 computing resources.

Figure 2C:
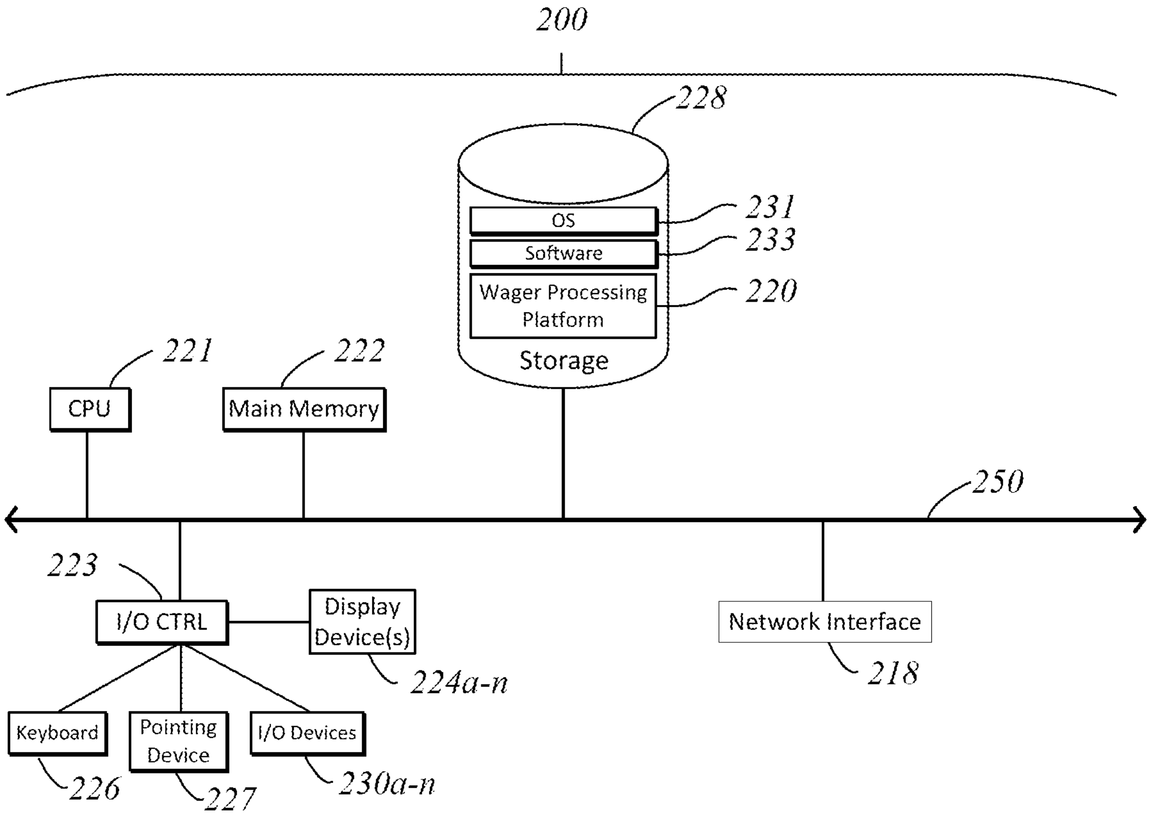
FIGS. 2C and 2D are block diagrams depicting computing devices useful in connection with the methods and systems described herein, according to an embodiment.
Figure 2D:
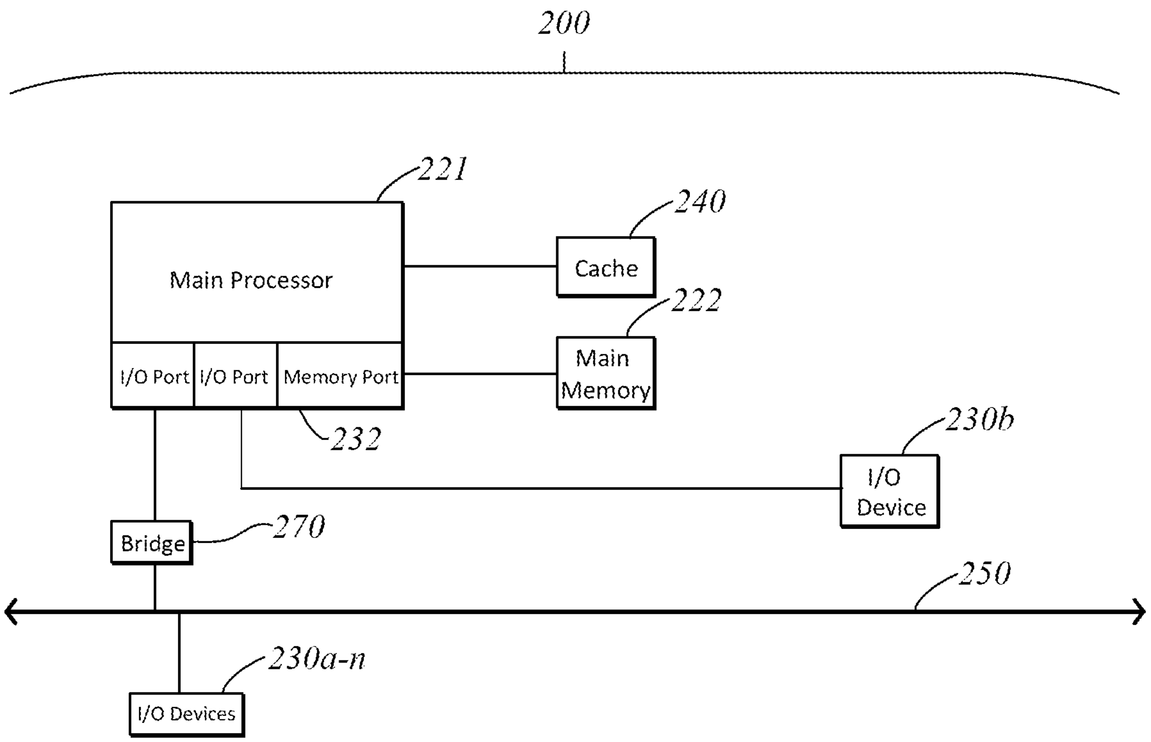

Each client device 202 and server 206 may be deployed as and/or executed on any type and form of computing device, e.g., a computer, network device or appliance capable of communicating on any type and form of network and performing the operations described herein. FIGS. 2C and 2D depict block diagrams of a computing device 200 useful for practicing an embodiment of the client device 202 or a server 206. As shown in FIGS. 2C and 2D, each computing device 200 includes a central processing unit 221, and a main memory unit 222. As shown in FIG. 2C, a computing device 200 may include a storage device 228, a network interface 218, an input/output (I/O) controller 223, and optional I/O devices, such as display devices 224*a*-224*n*, a keyboard 226, and a pointing device 227, such as a mouse. The storage device 228 may include, without limitation, an operating system 231, software 233, and a wager processing platform 220, which can implement any of the features of the wager processing server 110A described herein below in connection with FIG. 1. As shown in FIG. 2D, each computing device 200 may also include additional optional elements, such as a memory port 232, a bridge 270, one or more input/output devices 230*a*-230*n* (generally referred to using reference numeral 230), and a cache memory 240 in communication with the central processing unit 221.

The central processing unit 221 is any logic circuitry that responds to and processes instructions fetched from the main memory unit 222. In many embodiments, the central processing unit 221 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 200 may be based on any of these processors, or any other processor capable of operating as described herein. The central processing unit 221 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 222 may include one or more memory chips capable of storing data and allowing any storage location to be directly accessed by the microprocessor 221. Main memory unit 222 may be volatile and faster than storage 228 memory. Main memory units 222 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 222 or the storage 228 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 222 may be based on any of the above described memory chips, or any other available memory chips capable of operating as described herein. In the embodiment shown in FIG. 2C, the processor 221 communicates with main memory 222 via a system bus 250 (described in more detail below). FIG. 2D depicts an embodiment of a computing device 200 in which the processor communicates directly with main memory 222 via a memory port 232. For example, in FIG. 2D the main memory 222 may be DRDRAM.

FIG. 2D depicts an embodiment in which the main processor 221 communicates directly with cache memory 240 via a secondary bus, sometimes referred to as a backside bus. In other embodiments, the main processor 221 communicates with cache memory 240 using the system bus 250. Cache memory 240 typically has a faster response time than main memory 222 and is typically provided by SRAM, BSRAM, or EDRAM. In the embodiment shown in FIG. 2D, the processor 221 communicates with various I/O devices 230 via a local system bus 250. Various buses may be used to connect the central processing unit 221 to any of the I/O devices 230, including a PCI bus, a PCI-X bus, or a PCI-Express bus, or a NuBus. FIG. 2D depicts an embodiment in which local buses and direct communication are mixed: the processor 221 communicates with I/O device 230*a* using a local interconnect bus while communicating with I/O device 230*b* directly. A wide variety of I/O devices 230*a*-230*n* may be present in the computing device 200. Input devices may include keyboards, mice, trackpads, or trackballs, among others. Output devices may include video displays, graphical displays, or speakers, among others.

Additional I/O devices 230*a*-230*n* can include, for example, haptic feedback devices, touchscreen displays, or multi-touch displays. Touchscreen, multi-touch displays, touchpads, touch mice, or other touch sensing devices may use different technologies to sense touch, including, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing additional functionality including, pinch, spread, rotate, scroll, or other gestures. The I/O devices may be controlled by an I/O controller 223 as shown in FIG. 2C. The I/O controller may control one or more I/O devices, such as, e.g., a keyboard 226 and a pointing device 227, e.g., a mouse or optical pen. Furthermore, an I/O device may also provide storage for the computing device 200. In still other embodiments, the computing device 200 may provide USB connections (not shown) to receive handheld USB storage devices. In some implementations, an I/O device 230 may be a bridge between the system bus 250 and an external communication bus, such as a universal serial bus (USB), a small computer system interface (SCSI) bus, a serial advanced technology attachment (SATA) bus, a FireWire bus, an Ethernet bus, a Gigabit Ethernet bus, a Fibre Channel bus, or a Thunderbolt bus.

In some embodiments, display devices 224*a*-224*n* may be connected to I/O controller 223. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, or liquid crystal laser displays.

In some embodiments, the computing device 200 may include or connect to multiple display devices 224*a*-224*n*, which each may be of the same or different type and/or form. As such, any of the I/O devices 230*a*-230*n* and/or the I/O controller 223 may include any type and/or form of suitable hardware, software, or combination of hardware and software to support, enable or provide for the connection and use of multiple display devices 224*a*-224*n* by the computing device 200. For example, the computing device 200 may include any type and/or form of video adapter, video card, driver, and/or library to interface, communicate, connect, or otherwise use the display devices 224*a*-224*n*. In some implementations, a video adapter may include multiple connectors to interface to multiple display devices 224*a*-224*n*.

Referring again to FIG. 2C, the computing device 200 may comprise a storage device 228 (e.g. one or more hard disk drives or redundant arrays of independent disks) for storing an operating system or other related software, and for storing application software programs such as any program related to the wager processing platform 220, which can include instructions to perform any of the functionalities of the wager processing server 110A described above in connection with FIG. 1. Examples of storage device 228 include a hard disk drive (HDD), an optical drive including CD drive, DVD drive, or BLU-RAY drive, a solid-state drive (SSD), a USB flash drive; or any other device suitable for storing data. Some storage devices may include multiple volatile and non-volatile memories, including, e.g., solid state hybrid drives that combine hard disks with solid state cache. Some storage device 228 may be non-volatile, mutable, or read-only. Some storage device 228 may be internal and connect to the computing device 200 via a bus 250. Some storage device 228 may be external and connect to the computing device 200 via an I/O device 230 that provides an external bus.

The computing device 200 may include a network interface 218 to interface to the network 204 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 200 communicates with other computing devices 200' via any type and/or form of gateway or tunneling protocol e.g. Secure Socket Layer (SSL) or Transport Layer Security (TLS). The network interface 218 may comprise a built-in network adapter, network interface card, PCMCIA network card, EXPRESSCARD network card, card bus network adapter, wireless network adapter, USB network adapter, modem, or any other device suitable for interfacing the computing device 200 to any type of network capable of communication and performing the operations described herein (e.g., the network 204, the network 130).

A computing device 200 of the sort depicted in FIGS. 2B and 2C may operate under the control of an operating system 231, which controls scheduling of tasks and access to system resources. The computing device 200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computing device 200 can be any workstation, telephone, desktop computer, laptop or notebook computer, tablet, server, handheld computer, mobile telephone, smartphone or other portable telecommunications device, media playing device, a gaming system, mobile computing device, or any other type and/or form of computing, telecommunications or media device that is capable of communication. The computing device 200 has sufficient processor power and memory capacity to perform the operations described herein. In some embodiments, the computing device 200 may have different processors, operating systems, and input devices consistent with the device. Further detailed description of the techniques for rebalancing bet portfolios are described in greater detail herein below in connection with FIGS. 3, 4, 5, and 6, respectively.

Figure 3:
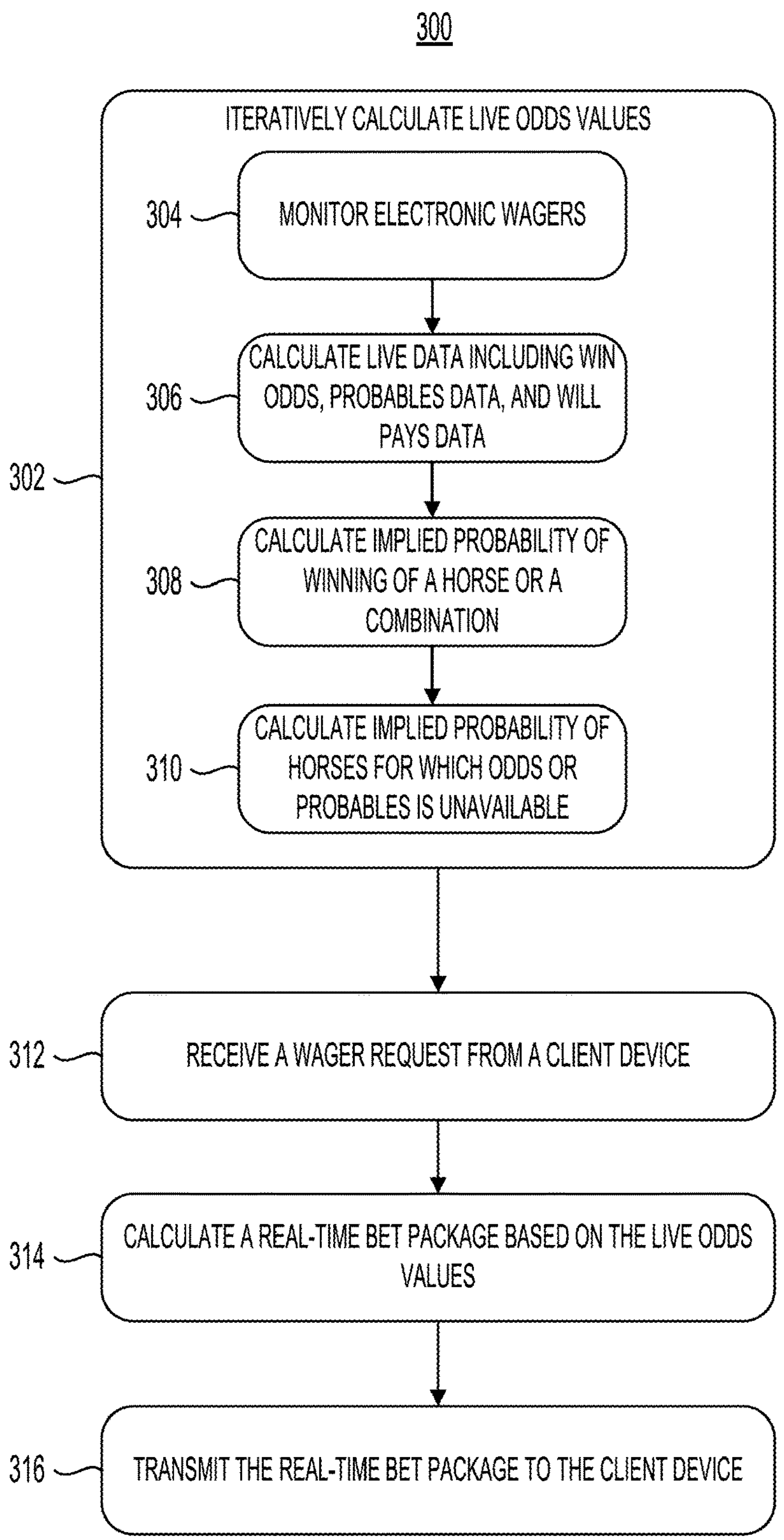
FIG. 3 illustrates a flow diagram of a process executed in a real-time horse race wager processing system for real-time rebalancing of bet portfolios in the pari-mutuel bet environment, according to an embodiment.

FIG. 3 illustrates an example flow diagram of a process executed in a real-time horse race wager processing system for real-time rebalancing of bet portfolios in the pari-mutuel bet environment, in accordance with an embodiment. As described herein, calculating mathematical and machine learning models, and constructing bet packages can be performed in real-time, asynchronously, or in near real-time. The method 300 may include steps 302-316. However, other embodiments may include additional or alternative steps, or may omit one or more steps altogether. The method 300 is described as being executed by a wager processing system (e.g., a computer similar to the wager processing server 110A, the electronic data source 120, or the end-user device 140 described in FIG. 1). One or more steps of method 300 may be executed by any number of computing devices, or any number of processors, operating in the distributed computing system described in FIG. 1. For instance, one or more computing devices (or one or more processors) may locally perform part, or all of the steps described in FIG. 3 or a cloud device (e.g., the cloud 208 or the servers 206 described herein in connection with FIGS. 2A-2B) and/or one or more cloud processors may perform such steps.

At step 302, a wager processing system (e.g., the wager processing server 110A) can iteratively calculate, in real time, bet packages implementing a certain betting strategy within the horse racing event. As shown, the step 302 includes the steps 304, 306, 308, and 310, which can each be performed by the wager processing system in each iteration of step 302. The step 302 can be computed, for example, each time a change in live odds for the horse racing event is detected by the wager processing system. The wager processing system can be, for example, part of a cloud computing system. Use of a cloud computing system can allow for scaling of the computing capacity of the wager processing system based on demands for wager requests, and can help to cost-effectively execute computationally intense workloads, such as the computation of real-time odds values, in real-time.

In the first iteration of step 302, as described herein, for a horse racing event, as betting begins, each horse has an associated live odds value, which is calculated and provided by a data source provider (e.g., an electronic data source 120). Horse racing events generally use a pari-mutuel betting scheme, and therefore any time additional money is wagered on a particular horse, the odds for that horse and the other horses in the race can change. To accommodate these changes and provide up-to-date odds information for horses in a particular horse racing event, the wager processing system can perform each step included in the step 302 iteratively.

At step 304 of an iteration of step 302, the wager processing system may monitor one or more electronic wagers submitted by one or more electronic devices (e.g., the end-user devices 140, the electronic data sources 120) corresponding to the horse racing event. Each electronic wager can include information that identifies at least one horse and a monetary amount associated with at least one horse. In a pari-mutuel pool, the odds for a particular horse are governed by the amount of money wagered on that horse to win or finish in a certain place (e.g., in the win pool that means to place in first, in the place pool that means to place in first or second, in the show pool that means to place in first, second, or third). Each betting opportunity, or pool, for each horse or a combination of horses can be associated with its own odds (or implied probabilities) although typically only win odds are shown to the user while opportunities in other pools are displayed via probables (expected payouts after the takeout). To use the most up to date live odds and probables in further processing steps, the wager processing system can retrieve wagering information, or odds data directly, from multiple data sources in real-time. This task can be performed continuously, or periodically, up until the horse race has begun.

For example, the wager processing system can query one or more of the data sources operated by racetrack owners or betting station owners, which can track or otherwise receive wagers on horses for a horse racing event. In some implementations, the wager processing system can request, query, or otherwise receive this data on a periodic basis. The frequency that the wager processing system receives or retrieves the wager information (or in some implementations, the odds data directly) can be related to how close in time the horse racing event will begin. For example, if the current time is far from when the race will begin, the data may be received or retrieved by the wager processing system more slowly, for example, once every three to five minutes. However, if the current time is close to the start time of the race, the data may be received or retrieved by the wager processing system more quickly, for example, once every three to five seconds. In addition, the wager processing system can implement an application programming interface (API) that can initiate a notification when a change in live odds is identified. The API can be provided to each of the kiosks, mobile applications, or client computing devices described herein to communicate live odds and derived calculations to the client devices as they are identified or calculated by the wager processing system.

The wager information received or retrieved by the wager processing system can include any information relating to a wager. For example, the wager information can include information describing individual wagers that have been placed between the last iteration of step 302 and the current time period. In some implementations, each wager in the wager information can identify one or more horses and a corresponding wager amount for each horse. In some implementations, the wager information can include aggregate pool information, for example, the total amount of money that has been wagered in the win pool, as well as the amount of money wagered on each horse to win. The wager information can include similar aggregate pool information for other pools, such as the place pool or the show pool.

At step 306 of an iteration of step 302, the wager processing system can calculate win odds, probables (expected payouts for single event wagers adjusted (or unadjusted) for takeout) or will pays (expected payouts for multi-race wagers, adjusted (or unadjusted) for takeout). These values can be calculated based on the pari-mutuel data derived from the wager amounts of wagers detected in step 304.

At step 308 of an iteration of step 302, the wager processing system can estimate or calculate implied probabilities of horses winning a horse racing event and their expected values across various pools based on other known data, such as win odds. To calculate the implied probability of each horse to win, the wager processing system can first subtract the amount the racetrack takes from the total pool (sometimes referred to as "the take"). The resulting difference is the amount of money that will be paid out if the event corresponding to the pari-mutuel pool (e.g., win, place, show) occurs. The wager processing system can divide that result by the total amount wagered on the horse to calculate the implied probability of horse winning the race. In some implementations, this value is rounded to the nearest tenth or to the nearest twentieth. The total amount wagered in the pool, as well as the total amount wagered on a particular horse, can be determined using the wagering information received by the wager processing system.

At step 310, the wager processing system can calculate implied probabilities of horses or combinations of horses in the horse racing event for which odds or probables data is not available, such as for Trifecta and Superfecta pools. To calculate potential payouts for exotic bets (e.g., trifecta, superfecta), the wager processing system can execute a machine learning model to estimate the payout. The machine learning model can include a feed-forward artificial neural network, using factors which are available to make predictions, such as the payout odds for simpler bets. The machine learning model can be trained to predict the payout odds for betting \$1 on any trifecta or superfecta combination. For simplicity we will focus on predicting superfecta bets. The model for trifecta bets will be very similar, and any differences will be highlighted when necessary. For the following description, let $\hat{h}:=\{h_1, h_2, h_3, h_4\}$ refer to the horses to wager on for a superfecta bet. The first step will be to choose the input factors for making the prediction. Non-limiting examples of race data, which could be available and useful may include the following: live payout odds of simpler bets on $\hat{h}$, including win odds of each horse in $\hat{h}$ and exacta odds of each combination in $\hat{h}$, as well as place and show odds, the fraction wagered on simpler bets (implied market outcome probability estimates for win and exacta outcomes), superfecta pool size, and the number of horses in the race. The race data can also include the rank of horses by betting odds. The race data can be received or calculated from the data retrieved or received from the data sources by the wager processing system.

The machine learning model can utilize the following widely available factors, as well as their respective logarithm: the win pool size, the number of horses in the race, the payout odds of simpler bets on $\hat{h}$, the win odds of each horse in $\hat{h}$, exacta odds for the $(h_1, h_2)$ combination, place odds of horses $\{h_1, h_2\}$, and shows odds of horses $\{h_1, h_2, h_3\}$, the rank of horses by win betting odds, and the normalized rank of horses by win betting odds. The machine learning model can also use the following built factors which approximate the trifecta and superfecta payouts, using Harville outcome probability estimation. Step 302 can be repeated iteratively, for example, each time an electronic wager is detected.

As described herein, the wager processing system has access to the win pool size, and the gross amount wagered on each horse to win, from which it can build market implied win probabilities for each horse, $\pi_i$, and model the probability of the sequence $\hat{h}$ finishing in order. Given that horse $h_1$ won, the wager processing system can reweight all of the other horses' win probabilities to sum to one and consider the subrace for second conditioned on horse $h_1$ finishing first. The probability of $h_2$ finishing second given horse $h_1$ won is then $$\pi_{1,2|1} = \frac{\pi_2}{(1-\pi_1)}.$$

The probability of $h_3$ coming in third given $h_1$ and $h_2$ came in first and second is $$\pi_{1,2,3|1,2} = \frac{\pi_3}{(1-\pi_1-\pi_2)},$$

and the probability of $h_4$ coming in fourth is $$\pi_{1,2,3,4|1,2,3} = \frac{\pi_4}{(1-\pi_1-\pi_2-\pi_3)}.$$

The Harville model for the probability of outcome $\hat{h}$ is then $$\begin{aligned}\pi_{\hat{h}} &= \pi_1\pi_{1,2|1}\pi_{1,2,3|1,2}\pi_{1,2,3,4|1,2,3} \\ &= \pi_1\frac{\pi_2}{(1-\pi_1)}\frac{\pi_3}{(1-\pi_1-\pi_2)}\frac{\pi_4}{(1-\pi_1-\pi_2-\pi_3)}\end{aligned} \tag{1}$$

The trifecta probability estimate is (1) without the $$\frac{\pi_4}{(1-\pi_1-\pi_2-\pi_3)}$$

term. The relationship between the payout odds $O_{\hat{h}}$ and outcome probabilities is $$\pi_{\hat{h}} = \frac{(1-t)}{(O_{\hat{h}}+1)} \tag{2}$$

where t is the track take for superfecta bets. The payout odds estimate is then:

$$O_{\hat{h}} = \frac{(1-t)}{\pi_{\hat{h}}} - 1. \tag{3}$$

Because the factors will be fed into a neural network, which will be trained using machine learning techniques described herein to adjust weights and biases, a viable factor for the model is to simply take $$\frac{1}{\pi_{\hat{h}}} \tag{4}$$

as a factor. In practice, given that exotic payouts tend to be overestimated with these kinds of models, it is important to develop more stable estimates which will not explode given at times particularly small implied win probabilities for some horses. A payout estimate is therefore developed using the rank of horses by win odds. There are different ways to build probabilities, but one simple method is to assign horse $h_1$ with rank $r_i$, where $r_i=1$ if it is the favorite by win odds and $r_i=n$ if it is the longshot with n horses in the race, the probability $$\pi_i^r = \frac{(n+1-r_i)}{\sum_{j=1}^{n} j}, \tag{5}$$

which ensures that $\pi_i^r \in (0,1)$ and $\Sigma_{i=1}^n \pi_i^r = 1$. Another superfecta payout estimate can be built by applying equation (5) in equations (1) and (4).

For an approximate payout model using exacta odds, consider that the wager processing system supplies the exacta payout odds. In general, this information is widely available from most wager processing systems. Let the actual exacta payout for the first two horses be $O_{1,2}$. The market implied probability of the exacta outcome is calculated as $$\pi_{1,2} = \frac{(1-t_e)}{(O_{1,2}+1)}, \tag{6}$$

where $t_e$ is the exacta pool track take (e.g., the percentage removed from the pool by the racetrack). Following the Harville model, an estimate of the probability of $\hat{h}$ is equal to:

$$\pi_{\hat{h}} = \frac{(1-t_e)}{(O_{1,2}+1)} \frac{\pi_3}{(1-\pi_1-\pi_2)} \frac{\pi_4}{(1-\pi_1-\pi_2-\pi_3)}, \quad (7)$$

with payouts odds of:

$$O_{\hat{h}} = \frac{(1-t)(O_{1,2}+1)}{(1-t_e)} \frac{(1-\pi_1-\pi_2)}{\pi_3} \frac{(1-\pi_1-\pi_2-\pi_3)}{\pi_4} - 1, \quad (8)$$

and again, this can be replaced by the simpler function:

$$(O_{1,2}+1) \frac{(1-\pi_1-\pi_2)}{\pi_3} \frac{(1-\pi_1-\pi_2-\pi_3)}{\pi_4}, \quad (9)$$

without needing to know the track takes. The trifecta payout is estimated using (9) without the $$\frac{(1-\pi_1-\pi_2-\pi_3)}{\pi_4}$$

term. The rank probabilities can also be used to build the factor $$(O_{1,2}+1) \frac{(1-\pi_1^r-\pi_2^r)}{\pi_3^r} \frac{(1-\pi_1^r-\pi_2^r-\pi_3^r)}{\pi_4^r}. \quad (10)$$

The logarithm of all of the proposed payout estimates can be used as factors as well.

The machine learning model can be a feedforward dense neural network with two hidden layers. For example, the size can be, without limitation, [42, 32, 32, 1] for the trifecta model and [56, 32, 32, 1] for the superfecta model. The machine learning model can use the factors from the Harville model above, for example, as training data. The model can include ReLu activation functions in one or more layers, with a mean absolute error loss function. The model can be trained, using outcome data received from the data sources after races complete, and can be trained using standard techniques. The model can thus be trained, as above, to predict the payout odds by comparing the output of the model to the observed payout odds in each race.

At step 312, the wager processing system can receive a wager request for the horse racing event from a client device (e.g., an end-user device 140). As described in detail herein in connection with FIG. 1, a client device, such as an end-user device, can display one or more GUIs that render information provided by the wager processing system. This information can include a betting interface, which can allow a client device to provide input parameters, such as selections of horses, expected payout or risk level, a prebuilt betting strategy or a set of expected win probabilities, which results in a betting strategy. A betting strategy can be any selection of one or more bets that a user places on a single race. Win chance and expected payout can be displayed on the display of the user device in connection with the set (or portfolio) of bets the customer is making, so a user of the client device can understand the impact of each selection as they make a wager.

However, as described herein, live odds can vary greatly as the start time of the race approaches, or any other time before the start time of the race. Thus, the wager processing system can offer in its GUI a capability to provide automatic rebalancing of a selected betting strategy. For example, a user may place a Dutch bet, which is a selection of several bets made to "hedge" the risk, or otherwise improve the overall chance of getting a payout. However, because the odds are changing, the amount of money wagered on each horse in the Dutch bet may no longer be optimal. If the race begins before the user can revise their bet, and if one of the placed wagers pays out, the user may stand to receive a payout less than they expected. The wager processing system can provide bet rebalancing functionality, which automatically changes the amount of money allocated and bet composition, if necessary, to maintain the target expected payout or level of risk. To do so, the wager processing system can monitor the data from the third party data streams for changing odds, execute the rebalancing calculation, and store it in association with a user profile corresponding to the device from which the wager request was received.

At step 314, the wager processing system can calculate a real-time bet package (sometimes referred to herein as a bet portfolio or a wager portfolio) based on the live odds values calculated in steps 302-310. To construct a bet portfolio the wager processing system can utilize the maximum amount the user is willing to wager—w, which can be included in the request for the betting portfolio. The set of horses in the race is H. The user can select a subset of horses $\hat{H}$ which restricts which wagers we can choose. The selection can be performed via a GUI at the end-user device from which the request is received. In some implementations, the subset of horses can be provided as part of the request. Feasible wagers must contain at least one horse from $\hat{H}$. Let $n=|H|$ be the number of horses in the race.

Let Ube the set of four horse outcomes. $|U|=n(n-1)(n-2)(n-3)$. If we number the horses, so that $H=[1, 2, \ldots, n]$, then U is the 4-permutation of H.

For each $u \in U$, the bets B which can pay out, in terms of finishing order, are 1) win on horse 1
2) place on horse 1
3) place on horse 2
4) show on horse 1
5) show on horse 2
6) show on horse 3
7) exactor on horses 1,2
8) trifecta on horses 1,2,3
9) superfecta on horses 1,2,3,4.

As described herein, the wager processing system maintains and can calculate the probability of each outcome, $\pi_u$.

To construct a bet portfolio based on a payout constraint (PC), the user will request to receive a payout of at least p. Our goal of the wager processing system will be to choose bets in order to maximize the probability $\pi_p$ of that occurring as in heuristic below:

0. Find all show bets, place bets, win bets on $\hat{H}$ that would give a payout>p if w was wagered. Find all exactor, trifecta, and superfecta bets containing horses in $\hat{H}$ that would give a payout>p if w was wagered. Sort all bets within each type from most probable to least probable.

The wager processing system can only wager up to w, so in the following steps, if the amount required to get a payout p is greater than what is left of w from previous bets, the wager processing system will not create a wager and consider the next bet.

1. Bet the least amount to achieve a payout of p starting with the most probable to least probable show bet.
2. Bet the least amount to achieve a payout of p starting with the most probable to least probable place bet on horses not wagered on in step 1.
3. Bet the least amount to achieve a payout of p starting with the most probable to least probable win bet on horses not wagered on in steps 1 and 2.
4. Bet the least amount to achieve a payout of p starting with the most probable to least probable exactor bet. Exclude bets where horse 1 was wagered on in steps 1, 2, or 3. Exclude bets where horse 2 was wagered on in steps 1 or 2.
5. Bet the least amount to achieve a payout of p starting with the most probable to least probable trifecta bet. Exclude bets where horse 1 was wagered on in steps 1, 2, or 3. Exclude bets where horse 2 was wagered on in steps 1 or 2. Exclude bets where horse 3 was wagered on in step 1. Exclude bets on horses 1 and 2 where 12 was wagered on in step 4.
6. Bet the least amount to achieve a payout of p starting with the most probable to least probable superfecta bet. Exclude bets where horse 1 was wagered on in steps 1, 2, or 3. Exclude bets where horse 2 was wagered on in steps 1 or 2. Exclude bets where horse 3 was wagered on in step 1. Exclude bets on horses 1 and 2 where 12 was wagered on in step 4. Exclude bets on horses 1, 2 and 3 where 123 was wagered on in step 5.

In each step the wager processing system will exclude bets which do not increase the probability of a payout given that they will pay out only if a previously made bet pays out. Step 0 does not need to be completed all at once, e.g., before step 1, only the subset of show bets needs to be determined.

To construct a bet portfolio based on a probability of payout constraint (PPC), the user will request to receive a payout with probability of at least r. The wager processing system can choose bets in order to maximize the expected payout as in the heuristic below. Let m equal the minimum allowable bet size, which varies by bet type.

1. Sort all superfecta bets containing horses in $\hat{H}$ in decreasing outcome probability. If the sum of the probabilities of the first $$\frac{w}{m}$$

bets is ≤r then proceed to the next step. Else, descend down the array until you find the least likely subarray of bets S of size≤

$$\frac{w}{m}$$

which nave a sum of probabilities≥r. Place minimum wagers of m on each bet of S and update w.

2. Sort all trifecta bets containing horses in $\hat{H}$ in decreasing outcome probability. If the sum of the probabilities of the first $$\frac{w}{m}$$

bets is ≤r then proceed to me next step. Else, descend down the array until you find the least likely subarray of bets S of size≤

$$\frac{w}{m}$$

which have a sum of probabilities≥r. Place minimum wagers of m on each bet of S and update w.

3. Sort all exactor bets containing horses in $\hat{H}$ in decreasing outcome probability. If the sum of the probabilities of the first $$\frac{w}{m}$$

bets is ≤r then proceed to the next step. Else, descend down the array until you find the least likely subarray of bets S of size≤

$$\frac{w}{m}$$

which have a sum of probabilities≥r. Place minimum wagers of m on each bet of S and update w.

4. Sort all win bets on horses in $\hat{H}$ in decreasing outcome probability. If the sum of the probabilities of the first $$\frac{w}{m}$$

bets is ≤r then proceed to the next step. Else, descend down the array until you find the least likely subarray of bets S of size≤

$$\frac{w}{m}$$

which have a sum of probabilities≥r. Place minimum wagers of m on each bet of S and update w.

5. Sort all place bets on horses in $\hat{H}$ in decreasing pool size. Iteratively add bets until the payout probability is ≥r. If the number of bets is >

$$\frac{w}{m}$$

then proceed to the next step. Else, descend down the array until you find the least likely subarray of bets S of size≤

$$\frac{w}{m}$$

which nave a sum of probabilities≥r. Place minimum wagers of m on each bet of S and update w.

6. Sort all show bets on horses in $\hat{H}$ in decreasing pool size. Iteratively add bets until the payout probability is ≥r. If the number of bets is >

$$\frac{w}{m}$$

then the program tails. Else, descend down the array until you find the least likely subarray of bets S of size≤

$$\frac{w}{m}$$

which nave a sum or probabilities≥r. Place minimum wagers of m on each bet of S and update w.

Any excess money can be placed on longshots on Ĥ in the superfecta and trifecta pool to keep the payout probability near r and to maximize the expected payout given that a payout occurs. If the program fails in step 6, return the payout probability from wagering minimum bets on $$\frac{w}{m}$$

most likely show bets.

To construct a bet portfolio based on a hedged betting model (HM), the user assigns h % of their portfolio to a hedging portfolio H and (1−h) % to a risky portfolio R.

Hedging Portfolio:

The hedging portfolio will try to maximize the probability of making the user's money back. This is accomplished by creating a (PC) portfolio with p=w, with hw to wager.

Risky Portfolio 1:

Risky portfolio 1 will try to maximize the expected payout given a winning bet has occurred. This is accomplished by creating a (PPC) portfolio with r=0 with (1−h)w to wager.

Risky Portfolio 2:

Risky portfolio 2 will always wager on the least likely to occur superfecta bets. Another option is to maximize the expected payout while also considering the value $V_b$ of the bets, which we define as $$V_b=(O_b+1)\pi_b$$

which is the expected payout of the bet. Let $m_b$ and $p_b^m$ be the minimum bet and the payout betting $m_b$. The payout per dollar wagered decreases, so once the wager processing system has wagered a certain amount on a particular outcome, it will be able to achieve a higher payout on a different bet.

Method:

$$V_b\frac{p_b^m}{m_b},$$

Find all bets containing at least one horse in Ĥ and sort in descending order by so that $$V_1\frac{p_1^m}{m_1} \geq V_2\frac{p_2^m}{m_2} \geq \ldots$$

Bet on b=1 until $$V_1\frac{p_1^m}{m_1} < V_2\frac{p_2^m}{m_2},$$

then wager on b=2 and so on until there are no more valid bets or all money has been wagered.

To estimate the expected payout and payout probability of an arbitrary strategy the wager processing system will generate the set U of all 4-permutations of the n horses in the race. Generate a matrix P of size |U|×|B|. In entry $P_{u,b}$, put the estimated payout of bet b on horses u. Generate the vector of expected superfecta payout probabilities $\pi^U$. Generate an indicator vector I of size |U| with $I_u$=1 if $(\Sigma_{b=1}^{|B|} P_{u,b})>0$, 0 otherwise.

Expected payout probability $EPP=\Sigma_{u=1, \ldots, |U|} I_u \pi_u^U$.

Expected payout $EP=\Sigma_{u=1}^{|U|}\Sigma_{b=1}^{|B|}P_{u,b}$.

To implement methods of managing losses at the racetrack, the wagering processing system will consider the general scenario where it can Dutch (common name for a hedging strategy) with an initial subset of horses and add more horses as necessary to limit the risk of the bet. The wager processing system will assume to have a fixed budget B to place wagers with. For simplicity it will only use market implied probabilities when constructing the bet. The track take is denoted as t. The payout odds of horse h to win is $O_h$. If $1 is wagered on horse h, the user will receive a payout of $O_h+1$. Given $O_h$, we can compute the market implied win probability $$\pi_h = \frac{(1-t)}{O_h+1}$$

Basic Dutching, when considering win bets is to wager an amount on each horse to win such that the payout is equal if any of the chosen horses win. Assuming there are n horses in the race, labeled 1,2,3, . . . , so that the set of horses is H={1, 2, 3, . . . , n}. Let the choice of initial horses be the subset Ĥ⊆H. The amount to wager on horse h∈Ĥ, is then $$w_h = B\frac{\pi_h}{\sum_{i\in\hat{H}}\pi_i}.$$

Note that the amount to wager does not depend on t, and can be ignored (set to zero) when making these calculations. Also note that this calculation assumes that the wager processing system can place an arbitrary wager size, but in practice wagers must be rounded in some manner to be valid.

Without any prior knowledge of a race with n horses running, the most rational guess of a randomly chosen horse to win is with probability $$\frac{1}{n}.$$

Given a horse h with a win probability $$\pi_h > \frac{1}{n},$$

the wagering processing system would assume that this is a relatively safe bet, and when $$\pi_h < \frac{1}{n},$$

it would assume that it a relatively risky bet.

Considering now the Dutch bet, if $$\sum_{i \in \hat{H}} \pi_i = \frac{|\hat{H}|}{n},$$

the horse selection is risk neutral, and any wager with a total win probability less than or greater than $$\frac{|\hat{H}|}{n}$$

is risky and safe, respectively, where $|\hat{H}|$ is the size of $\hat{H}$. Given a chosen risk appetite (which can be preselected by a user) with a parameter α, we can require that the horse selection's win probabilities satisfy $$\sum_{i \in \hat{H}} \pi_i \geq \alpha \frac{|\hat{H}|}{n}.$$

If it does not, then the wager processing system will add further horses to $\hat{H}$ until the condition is met. In general, the wager processing system will add horses with the lowest win probabilities which will satisfy the above equation. These horses will require the least amount wagered on them to satisfy the Dutch bet, limiting the effect on the original wagers. In addition, the wager processing system will not add too many horses, given minimum wage requirements and the error added by having to round the bets to be feasible.

Given a dataset of R races, to tune the wager processing system, one can run simulations using different values of α, for example for α={0.5, 0.6, . . . 1.5} and observe its effect. Some metrics to consider could be

- Total number of losing races
- Longest observed losing streak
- Largest drawdown (i.e. starting with an initial wealth of W=$100,000 and a fixed per race budget B=$100, the most we were ever down during the simulation) Overall profit To construct strategies for exacta betting, similar to win bets, the payout odds $O_{hi}$ for betting that horse h comes in first and horse i comes in second are publicly available. Given these payout odds, the wager processing system can compute the market implied exacta probability $$\pi_{hi} = \frac{(1-t)}{O_{hi}+1}.$$

To construct betting strategies for Quinella, which pays out when two chosen horses h and i finish first and second in any order, the wager processing system can construct a synthetic quinella by Dutching the exacta bets on outcomes [h, i] and [i, h]. Given a budget B, the quinella wagers are $$w_{hi} = B\frac{\pi_{hi}}{\pi_{hi}+\pi_{ih}}$$

$$w_{ih} = B\frac{\pi_{ih}}{\pi_{hi}+\pi_{ih}}.$$

To construct generalized Dutch betting strategies with exactas, given a subset $\hat{H} \subseteq H$ of horses to wager on, the wager processing system could restrict the exacta bets to selections from only $\hat{H}$. More wagers can be placed without this restriction while still placing the focus on the chosen horses in $\hat{H}$. This can be achieved by constructing a portfolio F of exacta bets which ensures that for all horses h, i∈$\hat{H}$, the expected payout given h finishes in the top 2 is equal to the expected payout given i finishes in the top 2, $$\mathbb{E}[\text{Payout from } F|h \text{ finishes top 2}] = \mathbb{E}[\text{Payout from } F|i \text{ finishes top 2}].$$

A stricter form of generalized Dutching for all h, i∈$\hat{H}$ would be requiring $$\begin{aligned} &\mathbb{E}[\text{Payout from } F \mid h \text{ wins}] \\ &= \mathbb{E}[\text{Payout from } F \mid h \text{ finishes second}] \\ &= \mathbb{E}[\text{Payout from } F \mid i \text{ wins}] \\ &= \mathbb{E}[\text{Payout from } F \mid i \text{ finishes second}]. \end{aligned}$$

Let U be the set of first two horse outcomes, which is all that is needed for computing exacta payouts. U is the 2-permutation of H, with size |U|=n(n−1). In order to compute the expected payout given horse i∈$\hat{H}$ finishes in the top 2, the wager processing system must consider the subset $b_i \subseteq U$ of outcomes which contain i, e.g., results of the form [i, −] or [−, i], where − is any horse other than i. Let $\pi_o$ be the probability of a two-horse outcome o∈$b_i$, for example $\pi_{3,2}$ where i could be 3 or 2, where its estimation can be found using the equation for $\pi_{hi}$. The conditional probability of o∈$b^i$ occurring given i finishes in the top 2 is then $$\pi_{o|b_i} = \frac{\pi_o}{\pi_{b_i}}$$

where $\pi_{b_i} = \sum_{j \in H \setminus i}(\pi_{ij}+\pi_{ji})$ is the probability of horse i finishing in the top 2. Let the bet portfolio be written as a vector: $F \in \mathbb{R}^{|U|}$. For each two-horse outcome [i,j]∈U, there is a corresponding cell, where the wager processing system will place the amount wagered on that exacta bet. Given the conditional probabilities and portfolio F, the conditional expected payout is then $$\mathbb{E}[\text{Payout from } F \mid i \text{ finishes top 2}] = \sum_{o \in b_i} \pi_{o|b_i} F_o O_o,$$

where $O_o$ are the payout odds for outcome o. Let G be the set of feasible portfolios, considering the feasible bet amounts that can be made for exactas. The basic optimization problem to do generalized Dutch betting is then $$\max_{\text{s.t. } F\in G,} \beta \quad \mathbb{E}[\text{Payout from } F \mid i \text{ finishes top } 2] \geq \beta \text{ for } i \in \hat{H}$$

where we are maximizing the minimum conditional expected payout for horses $i \in \hat{H}$.

To manage risk for exacta bets in a race with n horses, which has n(n−1) exacta bets, in a similar manner as described herein, the wager processing system will consider an exacta wager with a payout probability greater/less than $$\frac{1}{n(n-1)}$$

to be safe/risky. Let the indicator function of wagering on outcome $o \in U$ be denoted as $$z_o = \begin{cases} 1 & \text{if } F_o > 0 \\ 0 & \text{otherwise} \end{cases}.$$

Let $|F|$ equal the number of cells in F greater than 0, i.e., $|F|=\pi_{o\in U} z_o$. Let m be the minimum feasible bet size for exactas. We can now choose our risk appetite with the parameter α, and require that our exacta wagers satisfy the following inequalities.

$$\sum_{o\in U} \pi_o z_o \geq \alpha \frac{|F|}{n(n-1)}$$

$$m z_o \leq F_o \forall\, o \in U$$

$$| B z_o \geq F_o \forall\, o \in U$$

$$|F| = \sum_{o\in U} z_o$$

$$z_o \in \{0, 1\} \forall\, o \in U$$

$$F \in G.$$

The first inequality ensures that our payout probability is at least equal to $$\alpha \frac{|F|}{H(H-1)}.$$

The second and third inequalities ensure that $z_o>0$ if and only if $F_o>0$. The parameter α can be tuned in a similar manner as described herein for win bets. Also note that there are no restrictions on which exacta bets we place to satisfy the above inequalities. Using the equalities above the wager processing system can implement the exacta Dutch betting optimization program as follows:

$$\max_{\text{s.t. } F\in G,} \beta \quad \mathbb{E}[\text{Payout from } F \mid i \text{ finishes top } 2] \geq \beta \text{ for } i \in s$$

$$\sum_{o\in U} \pi_o z_o \geq \alpha \frac{|F|}{H(H-1)}$$

$$m z_o \leq F_o \forall\, 0 \in U$$

$$B z_o \geq F_o \forall\, 0 \in U$$

-continued $$|F| = \sum_{o\in U} z_o$$

$$z_o \in 0, 1 \forall\, o \in U$$

$$F \in G.$$

To construct generalized Dutch betting strategies with any type of bet, given a subset of horses $\hat{H} \subseteq H$, the wager processing system can construct a portfolio F of wagers such that for all horses $i,j \in \hat{H}$, we require that $$\mathbb{E}[\text{Payout from } F|i \text{ finishes top } 4] = \mathbb{E}[\text{Payout from } F|j \text{ finishes top } 4].$$

Let U be the set of first four horse outcomes, which is all that is needed for computing payouts. U is the 4-permutation of H, with size $|U|=n(n-1)(n-2)(n-3)$. In order to compute the expected payout given horse $i \in \hat{H}$ finishes in the top 4, we must consider the subset $b_i \subseteq U$ of outcomes which contain i, e.g. results on the form [i, –, –, –], [–,i, –, –], [–, –, i, –], or [–, –, –, i], where – is any horse other than i. Let $\pi_o$ be the probability of a four-horse outcome $o \in b_i$, for example o=[3, 2, 5, 7] where i could be 3, 2, 5, or 7, with its estimation described herein. The conditional probability of $o \in b^i$ occurring given i finishes in the top 4 is then $$\pi_{o|b_i} = \frac{\pi_o}{\pi_{b_i}},$$

where $\pi b_i = \Sigma_{o\in b_i} \pi_o$ is the probability of horse i finishing in the top 4. The bet portfolio—the total number of wagers that pays out in each race presented as a matrix is $F \in \mathbb{R}^{|U|\times N}$. Typically, N=9, considering win, place, show, exacta, trifecta, and superfecta. The wager processing system can then encode the betting portfolio by placing the amount wagered for each bet in the appropriate cell. For example, following the techniques described herein, in each row, in the fifth column of F, it would put the amount wagered on the horse which came in second to place. In the same way, it can build a payout matrix $P \in \mathbb{R}^{|u|\times N}$, which in each cell contains an estimated payout per $1 bet. Given our conditional probabilities, portfolio F, and payout matrix P, the conditional expected payout is then $$\mathbb{E}[\text{Payout from } F \mid i \text{ finishes top } 4] = \sum_{o\in b_i} \pi_{o|b_i} \overline{FP}_o,$$

where $\overline{FP}_o = \Sigma_{j=1}^{N} F_{o,j} P_{o,j}$. Let G be the set of feasible portfolios, considering the feasible bet amounts that can be made for each bet type. The basic optimization problem to do generalized Dutch betting is then $$\max_{\text{s.t. } F\in G,} \beta \quad \mathbb{E}[\text{Payout from } F \mid i \text{ finishes top } 4] \geq \beta \text{ for } i \in s$$

where we are maximizing the minimum conditional expected payout for horses $i \in s$.

To construct a generalized α, it is best to simply enforce a fixed payout probability α in each race. For each outcome $o \in U$, let $z_o \in \{0, 1\}$ be a binary variable which indicates if a payout occurs or not, which is defined as recovering our betting budget B. The following constraints can be added, $$\overline{FP_o} \geq z_o B \forall\, o \in U$$

$$\sum_{o=U} z_o \pi_o \geq \alpha$$

$$z_o \in \{0, 1\} \forall\, o \in U$$

Another option would be to replace B with β, but this would lead to a non-convex constraint, making the problem much harder to solve. Note that when satisfying the payout constraint, one is free to make wagers on any horse.

To further extend the payout constraint, the user may want to hedge the bets for the scenario where none of the horses $h \in \hat{H}$ finish in the top 4. The wager processing system can include a minimum expected payout conditioned on this event. Let $b_{H\backslash\hat{H}} \in U$ be the subset of outcomes of the form o=[h, i, j, k] where h, i, j, $k \notin \hat{H}$, e.g. none of the top four finishers are in $\hat{H}$, with $\pi_{b_{H\backslash\hat{H}}} = \Sigma_{o \in b_{H\backslash\hat{H}}} \pi_o$ being the probability of none of the horses $h \in \hat{H}$ coming in the top 4. The conditional probability of $o \in b_{H\backslash\hat{H}}$ occurring given no horses in $\hat{H}$ finish in the top 4 is $$\pi_{o|b_{H\backslash\hat{H}}} = \frac{\pi_o}{\pi_{b_{H\backslash\hat{H}}}}.$$

The expected payout given none of the horses in $\hat{H}$ finish in the top 4 is then $$\mathbb{E}\left[\text{Payout from } F \,\middle|\, \text{no } i \in \hat{H} \text{ finishes top } 4\right] = \sum_{o \in b_{H\backslash\hat{H}}} \pi_{o|b_{H\backslash\hat{H}}} \overline{FP}_o.$$

We can ensure that the user receives a fraction $\theta \in (0,1)$ of the payout β given none of the horses in $\hat{H}$ finish in the top 4 with the following constraint, $$\mathbb{E}\,[\text{Payout from } F | no\ i \in \hat{H} \text{ finishes top } 4] \geq \theta\beta.$$

This expected minimum payout depends on the optimal value for β. We could replace β with B if we prefer a fixed minimum recovery of our bet B, but it may occur that β<θB, and then we would be effectively betting against horses $h \in \hat{H}$.

In summary, the generalized Dutch betting strategy that can be implemented by the wager processing system will look as follows:

$$\max^{\beta} \mathbb{E}[\text{Payout FROM } F \mid i \text{ FINISHES TOP } 4] \geq \beta \text{ FOR } i \in \hat{H}$$

s.t.

$$\overline{FP_o} \geq z_o B \forall\, o \in U$$

$$| \; \Sigma_{o \in U} z_o \pi_o \geq \alpha$$

$$\mathbb{E}\left[\text{Payout FROM } F \,\middle|\, \text{NO } i \in \hat{H} \text{ FINISHES TOP } 4\right] \geq \phi\beta$$

$$F \in G,$$

$$z_o \in \{0, 1\} \forall\, o \in U.$$

Similar to tuning α, on can run back testing on historical races over a grid of different values for α and θ, for example for α, θ=[0, 0.1, 0.2, . . . 0.5], to find the values which best meet optimization objectives. The wager processing system can generate the real-time bet package for the client device, which can include a distribution of wagers on horses or combinations of horses that are calculated using the foregoing techniques.

At step 316, the wager processing system can transmit, to the client device, the generated bet package for display on the client device. Once the bet package has been calculated by the wager processing system, the wager processing system can transmit the bet package to the client device that provided the wager request. The bet package can, in some implementations, include display instructions that cause the client device to display the updated bet package in a GUI of the client device. The GUI can be presented as part of an application executing on the client device, or as part of a website provided by the wager processing system. However, as described herein, the live odds are monitored up until the race begins and can change as more participants place additional wagers on horses participating in the horse racing event. Therefore, the wager computing system can detect changes to live odds, and iteratively perform step 314 of the method 300 to ensure that the monetary amounts assigned to each horse, combination of horses, or bet in the bet package achieve the target expected payout return for the user. When a revision of odds occurs, along with a corresponding change in the bet package, the wager processing system can transmit the changed real-time bet package to the client device for display in the GUI. The display of the updated bet package can include a display of the win chance and expected value of the payout for the bet package. In this way, the user can observe the changes in bets on horses that were chosen as part of the wager request, changes in the assignment of monetary value to each bet, and any changes in win chance and the expected value of the overall bet package as odds are changing prior to the race starting.

In some implementations, the user may change the bet package, for example, by transmitting a request to replace one or more horses in the bet package with one or more different horses. The request can include identification of the horses that should be removed or replaced, and identifiers of horses that should be newly included in the bet package. The wager processing system can detect the change by parsing the request and calculate an updated bet package based on the specified horses in the request by performing step 314 of the method using the updated selection of horses.

In some implementations, the change requested by the user is a change in the total wager amount for the bet package or a parameter, such as expected payout or level of risk. Likewise, the wager processing system can detect the change by parsing the request and transmit a notification to the client device that includes the updated bet package, as described herein. The updated bet package can be displayed in the GUI and can be iteratively updated up until the race start time in accordance with the steps of the method 300.

In some implementations, following the transmission of a betting package, the wager processing system can detect a further change to live odds, and generate a notification to transmit to the client device that indicates that the change to live odds affects the bet composition of the betting package. In some implementations, the wager processing system can compare the change in odds values to a threshold, which can be a predetermined threshold, a threshold provided by the client device (e.g., when creating a user profile). The notification, when transmitted to the client device, can display on a GUI of an application executing at the client device that the tracked values have exceeded the threshold. In some implementations, the notification can include one or more user interface elements that cause the client device to transmit a wager request to the wager processing system.

In a non-limiting example of a use case for the method 300, a user may execute a wagering application on a mobile device that communicates with the wager processing system. The wagering application can include interactive user interface elements that allow a user to select races, horses, and wager amounts. The wagering application can also allow the user to place wagers on races by communicating with the wager processing system, for example, by transmitting a request to place a wager that identifies one or more races, one or more horses, or a wager amount, or any combination thereof. In a non-limiting example, using the wagering application, a user can transmit a request to the wager processing system that includes a wager amount and a selection of several horses that will participate in a horse race. Using the operations of the method 300 described herein, the wager processing system can calculate a bet package based on the selected horses identified in the request and live odds for each of the selected horses. The bet package includes a distribution of the wager amount across the selected horses to meet a certain strategy, for example a combination of safe and risky bets, target risk or expected payout. The wager processing system can then transmit the bet package to the mobile device, which can display properties of the bet package in a graphical user interface of the wagering application. The wager processing system can continuously monitor for updates in live odds, as described herein, and revise the bet package as live odds change. The wager processing system can communicate the revised bet package to the wagering application, such that the user of the wagering application can observe the changes to bet types and the wager amount distribution for each of the selected horses in real-time. These revisions can continue until the start time of the horse race, after which bets are closed and the optimal bet package for the selected horses is wagered.

Figure 4:
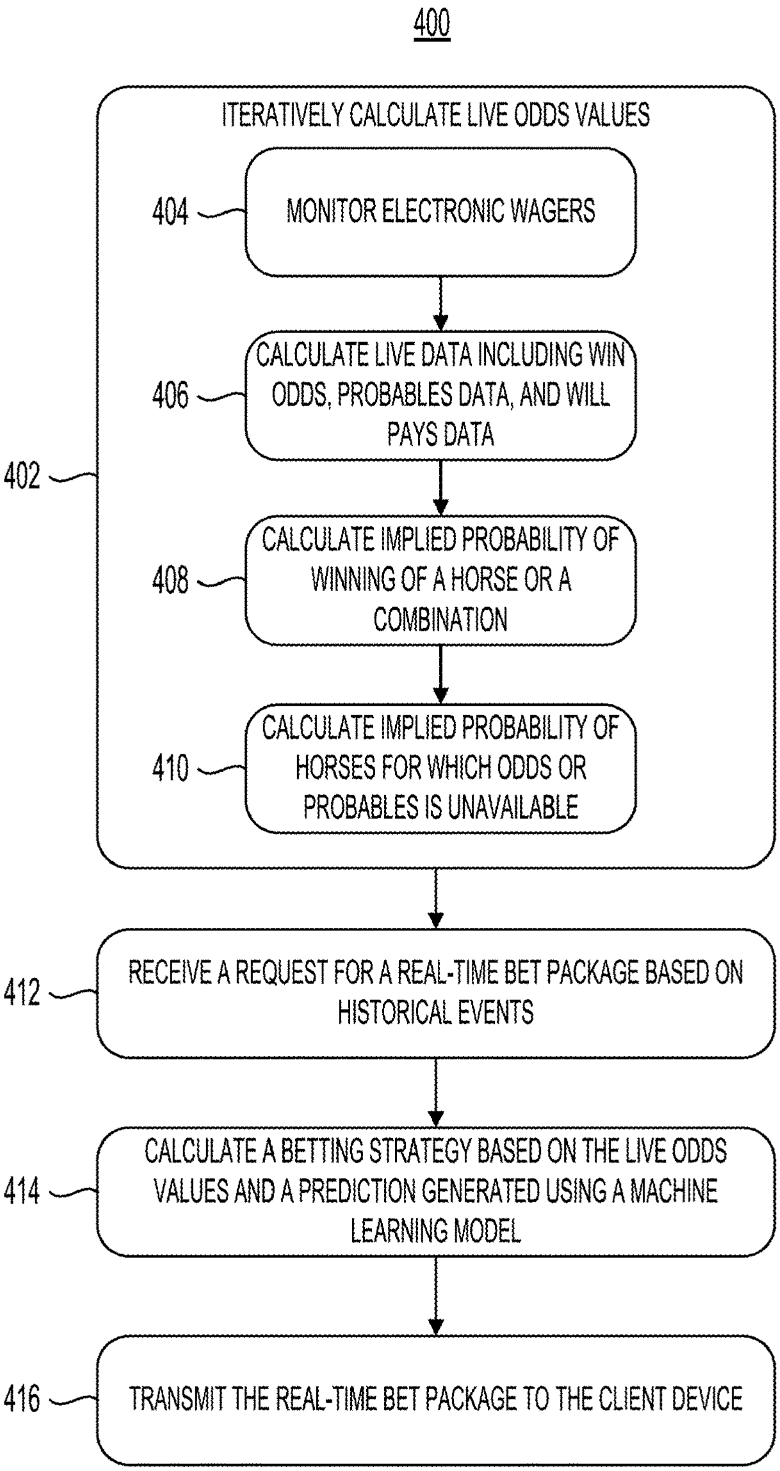
FIG. 4 illustrates a flow diagram of a process executed in a real-time horse race wager processing system for providing betting strategy recommendations based on historical events sharing the same characteristics as a current event, according to an embodiment.

FIG. 4 illustrates an example flow diagram of a process executed in a real-time horse race wager processing system for bet optimization, in accordance with an embodiment. The method 400 may include steps 402-416. However, other embodiments may include additional or alternative steps, or may omit one or more steps altogether. The method 400 is described as being executed by a wager processing system (e.g., a computer similar to the wager processing server 110A, the electronic data source 120, or the end-user device 140 described in FIG. 1). However, one or more steps of method 400 may be executed by any number of computing devices operating in the distributed computing system described in FIG. 1. For instance, one or more computing devices may locally perform part or all of the steps described in FIG. 4 or a cloud device (e.g., the cloud 208 or the servers 206 described herein in connection with FIGS. 2A-2B) may perform such steps.

At step 402, a wager processing system (e.g., the wager processing server 110A) can iteratively calculate, in real time, real-time odds values based on attributes of a horse racing event and an initial odds value for each horse within the horse racing event. As shown, the step 402 includes the steps 404, 406, 408, and 410, which can each be performed by the wager processing system in each iteration of step 402. Step 402 can be similar to and include performing all of the operations described in step 302 described herein in connection with FIG. 3. Likewise, each of the steps 404, 406, 408, and 410 respectively correspond to and can include performing all of the operations described in steps 304, 306, 308, and 310 described herein in connection with FIG. 3.

At step 412, the wager processing system can receive a request for a real-time bet package or betting strategy based on historical events. To request a betting strategy, a user can use a client device to transmit a request to the wager processing system for a betting strategy. The request for the betting strategy can include an indication of the horse race on which the user intends to place a wager. As described in detail herein in connection with FIG. 1, a client device, such as an end-user device, can display one or more GUIs that render information provided by the wager processing system. This information can include a betting interface, which can allow a client device to provide wagers, make selections of horses, or request betting strategies. Upon an interaction with a corresponding user interface element, the client device can transmit the request for the betting strategy to the wager processing system. In some implementations, the request for the betting strategy can include one or more selections of horses, and the wager processing system can add the selection of the one or more horses in the betting strategies recommended to the user device. Upon receiving the request, the wager processing system can proceed to perform step 414 of the method 400.

At step 414, the wager processing system can recommend a betting strategy based on the historical outcomes and its performance on a race or a racetrack, and a prediction generated using a machine learning model. To do so, the wager processing system can iterate over several betting strategies for the identified horse race. Because the possible number of betting strategy implementations for a horse racing event can be numerous, to aid the user, the wager processing system can test a set of strategy implementations to identify if one of them is more superior given the race circumstances and racetrack. In some cases, the user can further narrow the subset of strategy types to analyze for a particular race. For example, the user may select one or more horses that should be utilized in each potential strategy, thereby narrowing the number of potential strategies to only those that include the selected number of horses. Likewise, in some implementations, the user can specify one or more bet types (e.g., exacta, trifecta, superfecta) or a specific strategy type (e.g., Dutch) that they intend to use to wager on the horse racing event.

The wager processing system can be configured with pre-tested betting strategy recommendations based on enumerated strategies and horse racing event attributes. The horse racing event attributes used can include, for example, an identifier of the racetrack for the specified horse race, one or more identifiers of horses that will participate in the horse race, and a class of the horse race. When the model is trained, the model is fed a large set of diverse historical horse racing attribute information. What follows is a description of the derivation of the scenario model, in which the enumerated betting strategies can be represented as $S: = [S_1, S_2, \ldots, S_s]$, a number of racetracks can be represented as $T:=[T_1, T_2, \ldots, T_t]$, a number of classes of races can be represented as $C:=[C_1, C_2, \ldots, C_c]$, and a range of horses which could run in a race can be represented as $H:=[H_1, H_1+1, \ldots, H_h]$. For a given race r, let the set of predictors be $p_r=[T_r, C_r, H_r]$, where $T_r$ indicates the racetrack, $C_r$ indicates the class of the race and $H_r$ is the number of horses in race r. For given $p_r$, the wager processing system can predict the returns $R_r$ of the strategies in race r based on historical performance. In some implementations, the wager processing system can include one or more horses selected in the betting strategy request in the analysis described herein.

For each race with factors $p_r=[T_r, C_r, H_r]$, $T_r$ is a binary array one hot encoded indicating the race's track, $C_r$ is a binary array one hot encoded indicating the class of the race, and $H_r \in H$ equals the number of horses in the race. The output the wager processing system predicts $R^r$ which equals the return of each strategy in race r. For each strategy i=1, . . . , s, let $B^r_i$ be the amount bet, and let $P^r_i$ be the payout, then $$R_i^r = \frac{P_i^r - B_i^r}{B_i^r},$$

and $$R^r = [R_1^r, R_2^r, \ldots, R_s^r].$$

The wager processing system can utilize historic racing data, which can be provided by one or more data sources or maintained by the wager processing system, to train the model. For a large sample of races for all possible race scenarios, $[T_i, C_j, H_k]$ for i=1, . . . , t, j=1, . . . , c, and k=1, . . . , h, the expected return of each strategy can be computed. However, only a small sample of races may be available for some of the race scenarios. In order to get accurate estimates of the expected returns, the wager computing system can pool some of the race scenarios to have an adequate number of samples to ensure our estimates are meaningful. To do so, the wager processing system can use a regression tree to group the race scenarios together, for example, by training a decision tree regressor. To achieve meaningful return estimates and to avoid overfitting, the wager processing system can set the minimum number of samples required to be at a leaf node to a large value.

In doing so, a split point at any depth of the model will only be considered if it leaves at least the minimum number of training samples in each of the left and right branches. This can have the effect of smoothing the model. This method will partition races until further doing so will increase the mean squared error of the returns of the races in the resulting leaves. This in essence pools races together which share similar predictors $p_r$ and for which strategy $S_m$ exhibits similar returns. This will control our expected return estimates' standard deviation, helping to ensure that it is statistically significant. For each race scenario $[T_i\ C_j, H_k]$, the expected return can be computed for each strategy by computing the expected return using each strategy's decision tree. The decision tree model can be trained, for example, by using the historic race outcome information received by the wager processing system as described above.

Additionally, the wager processing system can perform any of the techniques described in connection with step 314 of FIG. 3 to enumerate one or more betting strategies for the user. The betting strategies may be generated based on the predicted outcomes generated by the machine learning model(s), as described herein. The wager processing system can select a recommended betting strategy from the outcomes produced. In general, the wager processing system can select a betting strategy which corresponds to the highest expected payout given a level of risk chosen by the user and provide it to the user that made the request for the strategy recommendation. In some implementations, the wager processing system can provide a list of top-ranking betting strategies, and the user can make a selection of one or more betting strategies from the list to use for a wager. To do so, the wager processing system can rank the betting strategies by the expected payout. In some implementations, the betting strategies can be ranked by the expected level of risk.

At step 416, the wager processing system can transmit, to the client device, the recommended real-time betting package based on the recommended betting strategy for display at the client device prior to the start time of a horse racing event. In some implementations, the wager processing system can transmit the recommended betting package in response to detecting a revision to live odds. Because bet composition is affected by live odds, the bet composition of the recommended betting package for a particular user may change as the odds for one or more horses change. Therefore, the wager processing system can perform the steps outlined above when a change in live odds is detected, such that the user can be provided with the recommended betting package based on real-time wagering data. In implementations where the wager processing system recommends a betting package, the wager processing system can transmit the recommended betting package to the client device, which can include identifiers of the recommended betting package selected by the wager processing system.

The transmission including the recommended strategies or recommended bet packages can, in some implementations, include display instructions that cause the client device to display the recommended strategies or bet packages in a GUI of the client device. The GUI can be presented as part of an application executing on the client device, or as part of a website provided by the wager processing system. The display of the recommended bet packages can include a display of the expected value of the payout and the probability of winning for the bet package. In this way, the user can observe the expected payout and the probability of winning for the recommended strategy selected by the wager processing system, and place wagers accordingly via the wager processing system as described herein. The recommendation can be transmitted to the client device prior to the start time of the horse racing event, such that the user can place wagers using the strategies as described herein.

Figure 5:
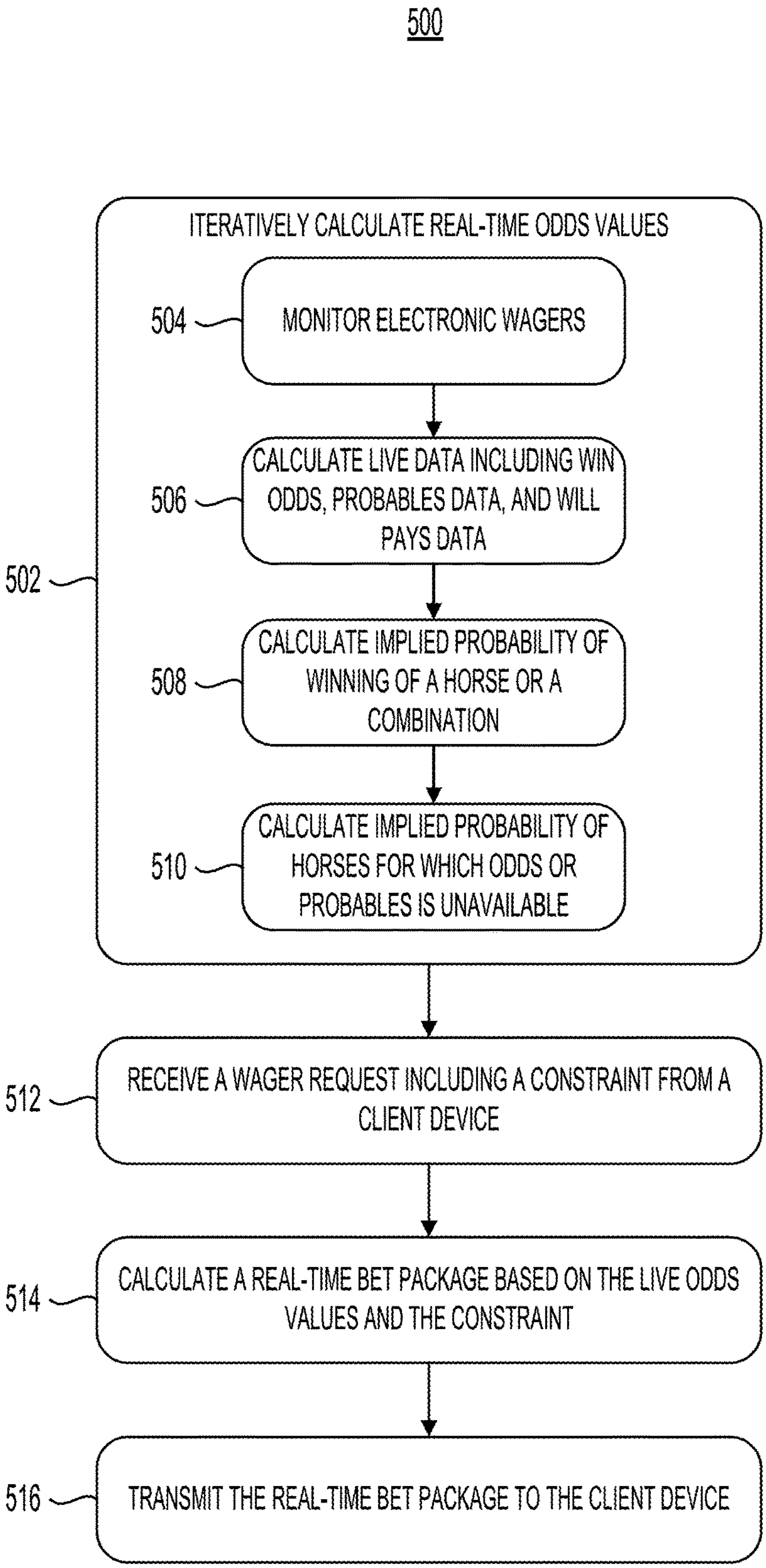
FIG. 5 illustrates a flow diagram of a process executed in a real-time horse race wager processing system for providing real-time bet packages based on constraint-optimized betting strategies, according to an embodiment.

FIG. 5 illustrates an example flow diagram of a process executed in a real-time horse race wager processing system for balancing payout and risk in a bet portfolio based on user-defined constraints, in accordance with an embodiment. The method 500 may include steps 502-516. However, other embodiments may include additional or alternative steps, or may omit one or more steps altogether. The method 500 is described as being executed by a wager processing system (e.g., a computer similar to the wager processing server 110A, the electronic data source 120, or the end-user device 140 described in FIG. 1). However, one or more steps of method 500 may be executed by any number of computing devices operating in the distributed computing system described in FIG. 1. For instance, one or more computing devices may locally perform part, or all of the steps described in FIG. 5, or a cloud device (e.g., the cloud 208 or the servers 206 described herein in connection with FIGS. 2A-2B) may perform such steps.

At step 502, a wager processing system (e.g., the wager processing server 110A) can iteratively calculate, in real time, real-time odds values based on attributes of a horse racing event and an initial odds value for each horse within the horse racing event. As shown, the step 502 includes the steps 504, 506, 508, and 510, which can each be performed by the wager processing system in each iteration of step 502. Step 502 can be similar to and include performing all of the operations described in step 302 described herein in connection with FIG. 3. Likewise, each of the steps 504, 506, 508, and 510 respectively correspond to and can include performing all of the operations described in steps 304, 306, 308, and 310 described herein in connection with FIG. 3.

At step 512, the wager processing system can receive a wager request for the horse racing event from a client device (e.g., an end-user device 140). As described in detail herein in connection with FIG. 1, a client device, such as an end-user device, can display one or more GUIs that render information provided by the wager processing system. This information can include a betting interface, which can allow a client device to provide input parameters, such as selections of horses, expected payout or risk level, a prebuilt betting strategy or a set of expected win probabilities, which results in a betting strategy. A betting strategy can be any selection of one or more bets that a user places on a single race. Win chance and expected payout can be displayed on the display of the user device in connection with the set (or portfolio) of bets the customer is making, so a user of the client device can understand the impact of each selection as they make a wager.

However, as described herein, live odds can vary greatly as the start time of the race approaches, or any other time before the start time of the race. Thus, the wager processing system can offer in its GUI a capability to provide automatic rebalancing of a selected betting strategy. For example, a user may place a Dutch bet, which is a selection of several bets made to "hedge" the risk, or otherwise improve the overall chance of getting a payout. However, because the odds are changing, the amount of money wagered on each horse in the Dutch bet may no longer be optimal. If the race begins before the user can revise their bet, and if one of the placed wagers pays out, the user may stand to receive a payout less than they expected. The wager processing system can provide bet rebalancing functionality, which automatically changes the amount of money allocated and bet composition, if necessary, to maintain the target expected payout or level of risk. To do so, the wager processing system can monitor the data from the third party data streams for changing odds, execute the rebalancing calculation, and store it in association with a user profile corresponding to the device from which the wager request was received.

At step 514, the wager processing system can calculate a betting strategy based on a set of constraints. In general, the constraints can be e.g., expected return, expected likelihood of a winning bet. Using the input from the user device, the wager processing system can perform constraint optimization on betting strategies to optimize for the range specified by the constraints. Because many of the betting strategies can be optimized to meet the defined constraints, the wager processing system can send the user a set of optimized betting strategies to be selected from to build a betting package. The constraint optimization techniques can be utilized in connection with any of the techniques described in relation with FIGS. 3 and 4, to calculate a betting strategy or real-time bet package based on both the constraint(s) provided by the user and the live odds values. For instance, the wager processing system can optimize one or more betting strategies subject to the one or more betting constraints and generate the real-time bet package based on the optimized one or more betting strategies. The wager processing system can optimize the one or more betting strategies by calculating, using the machine learning model and the live odds, a plurality of outcome predictions of a plurality of betting strategies, and select one or more betting strategies from the plurality of betting strategies with corresponding outcome predictions satisfying the one or more betting constraints. The user can specify or select a type (or one or more types) of one or more betting constraints.

At step 516, the wager processing system can transmit the betting package, based on a constraint-optimized betting strategy for display at the client device prior to the start time of a horse racing event. Because the odds for horses can fluctuate prior to the start of a race, the constraint-optimized betting package for a particular user may change as live odds for one or more horses change. Therefore, the wager processing system can perform the steps outlined above when a change in live odds is detected, such that the user can be provided with a constraint-optimized betting package based on real-time wagering data. Once the one or more constraint-optimized strategies have been selected by the wager processing system, the wager processing system can transmit the betting package to the client device that provided the request for the betting scenario. In implementations where the wager processing system generates a betting package using the constraint-optimized betting strategy, the wager processing system can transmit the generated betting package to the client device, which can include identifiers of the constraint-optimized betting strategy selected by the wager processing system.

The transmission including the constraint-optimized betting strategy(s) can, in some implementations, include display instructions that cause the client device to display the constraint-optimized betting strategy(s) in a GUI of the client device. The GUI can be presented as part of an application executing on the client device, or as part of a website provided by the wager processing system.

The display of the betting package based on the constraint-optimized strategy can include a display of the expected value of the payout for the bet package. In this way, the user can observe the expected payout for the betting package based on the constraint-optimized strategy calculated by the wager processing system, and place wagers accordingly via the wager processing system as described herein. The constraint-optimized strategy can be transmitted to the client device prior to the start time of the horse racing event, such that the user can place wagers as described herein.

In a non-limiting example of a use case for the method 500, a user may execute a wagering application on a mobile device that communicates with the wager processing system. The wagering application can include interactive user interface elements that allow a user to select races, horses, and wager amounts. In addition, the wagering application can include a user interface element that allows a user to select various constraints, such as risk tolerance, expected payout, field size and others for betting strategy optimization. The wagering application can also allow the user to request betting strategies for horse races by communicating with the wager processing system, for example, by transmitting a request for a betting strategy that identifies one or more races, one or more horses, a selected risk tolerance value, or a wager amount, other race-specific parameters, or any combination thereof.

In a non-limiting example, using the wagering application, a user can transmit a request for a betting strategy to the wager processing system that identifies an upcoming horse race, a wager amount, a risk tolerance value or a target payout value. Using the operations of the method 500 described herein, the wager processing system can determine a betting strategy that provides maximum payout within a range of betting strategies that corresponds to the selected constraints. The determined betting strategy can include a combination of one or more horses on which to wager. The strategy can include a distribution of the wager amount across the various bet types for the horses chosen by the wager processing system to maximize total payout, in accordance with the selected constraints. The wager processing system can then transmit the betting package to the mobile device, which can display the combination of horses, the overall payout odds, and the distribution of the wager amount in a user interface of the wagering application. As live odds change over time, the wager processing system can determine whether the betting strategy for the identified horse race has changed. When a change is detected, the wager processing system can revise the betting package such that it remains in accordance with the constraints of the selected betting strategy, and transmit the revised package to the mobile device for display in the wagering application. These revisions can continue until the start time of the horse race.

Figure 6:
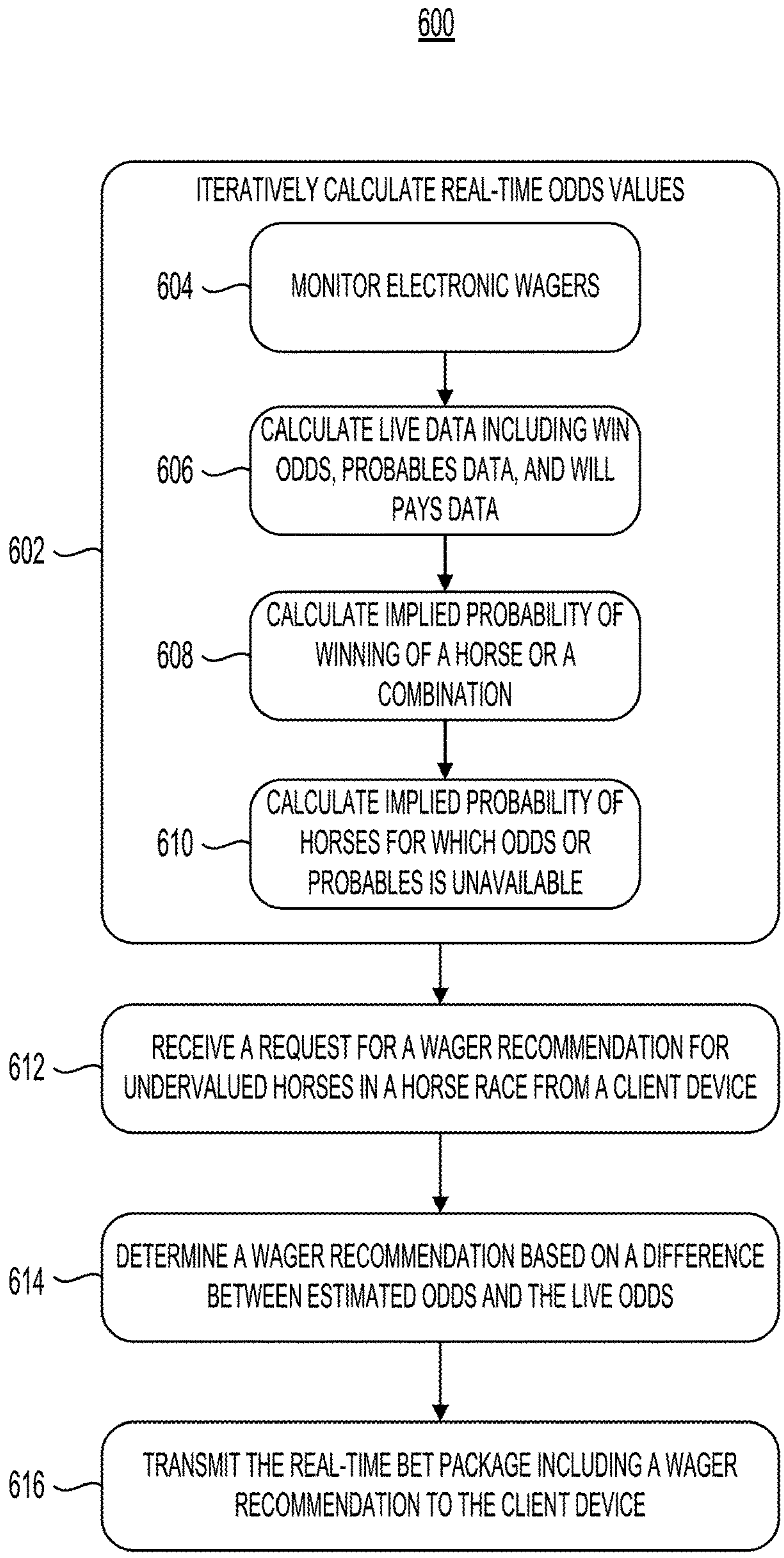
FIG. 6 illustrates a flow diagram of a process executed in a real-time horse race wager processing system for providing wager recommendations for horse races based on undervalued horses or horse combinations, according to an embodiment.

FIG. 6 illustrates an example flow diagram of a process executed in a real-time horse race wager processing system for providing wager recommendations for horse races based on undervalued horses or horse combinations, in accordance with an embodiment. The method 600 may include steps 602-616. However, other embodiments may include additional or alternative steps, or may omit one or more steps altogether. The method 600 is described as being executed by a wager processing system (e.g., a computer similar to the wager processing server 110A, the electronic data source 120, or the end-user device 140 described in FIG. 1). However, one or more steps of method 600 may be executed by any number of computing devices operating in the distributed computing system described in FIG. 1. For instance, one or more computing devices may locally perform part, or all of the steps described in FIG. 6, or a cloud device (e.g., the cloud 208 or the servers 206 described herein in connection with FIGS. 2A-2B) may perform such steps.

At step 602, a wager processing system (e.g., the wager processing server 110A) can iteratively calculate, in real time, real-time odds values based on attributes of a horse racing event and an initial odds value for each horse within the horse racing event. As shown, the step 602 includes the steps 604, 606, 608, and 610, which can each be performed by the wager processing system in each iteration of step 602. Step 602 can be similar to and include performing all of the operations described in step 302 described herein in connection with FIG. 3. Likewise, each of the steps 604, 606, 608, and 610 respectively correspond to and can include performing all of the operations described in steps 304, 306, 308, and 310 described herein in connection with FIG. 3.

At step 612, the wager processing system can receive a request for a wager recommendation or a real-time bet package including a wager recommendation for undervalued horses in a horse race from a client device (e.g., the end-user device 140). As described in detail herein in connection with FIG. 1, a client device, such as an end-user device, can display one or more GUIs that render information provided by the wager processing system. This information can include a betting interface, which can allow a client device to provide input parameters, such as selections of horses, expected payout or risk level, a prebuilt betting strategy or a set of expected win probabilities, which results in a betting strategy. A betting strategy can be any selection of one or more bets that a user places on a single race. Win chance and expected payout can be displayed on the display of the user device in connection with the set (or portfolio) of bets the customer is making, so a user of the client device can understand the impact of each selection as they make a wager.

However, as described herein, live odds can vary greatly as the start time of the race approaches, or any other time before the start time of the race. Thus, the wager processing system can offer in its GUI a capability to provide automatic rebalancing of a selected betting strategy. For example, a user may place a Dutch bet, which is a selection of several bets made to “hedge” the risk, or otherwise improve the overall chance of getting a payout. However, because the odds are changing, the amount of money wagered on each horse in the Dutch bet may no longer be optimal. If the race begins before the user can revise their bet, and if one of the placed wagers pays out, the user may stand to receive a payout less than they expected. The wager processing system can provide bet rebalancing functionality, which automatically changes the amount of money allocated and bet composition, if necessary, to maintain the target expected payout or level of risk. To do so, the wager processing system can monitor the data from the third party data streams for changing odds, execute the rebalancing calculation, and store it in association with a user profile corresponding to the device from which the wager request was received.

At step 614, the wager processing system can calculate or determine a real-time bet package (e.g., using the techniques described in connection with one or more of FIG. 1, 3, 4, or 5) including a wager recommendation for the horse racing event based on a difference between live odds for the horse racing event and estimated odds for each horse participating in the horse racing event. As described herein, live odds for a horse do not necessarily indicate a probability that a horse will finish in a particular position in a race. Thus, if there is a horse that appears to be undervalued or has odds that are higher than the estimated odds of the horse, the expected payout for betting on that horse is higher than live odds would otherwise indicate. To leverage this difference, the wager processing system can determine a difference between live odds and the estimated odds values for each horse participating in the horse race identified in the wager recommendation request.

If live odds are higher than the estimated odds, the wager processing system can estimate an expected value of the payout for that horse according to the estimated odds. The wager processing system can generate a list of horses that are identified as undervalued and sort the list by the calculated expected payout. The wager processing system can then generate a wager recommendation including a betting package. The estimated odds values for the horse may be calculated using the machine learning models and historical data as described in connection with FIG. 4, and based on the bet strategy determination techniques described in connection with step 314 of FIG. 3.

At step 616, the wager processing system can transmit the real-time bet package including the wager recommendation for the horse racing event generated based on undervalued horses for display at the client device prior to the start time of the horse racing event. The wager processing system can transmit the wager recommendation for the horse racing event in response to detecting a revision to live odds, for example. Because the horses selected for the wager recommendation are selected as undervalued in comparison to live odds, the undervalued horses having the best payout for a horse race may change as live odds for one or more horses change. Therefore, the wager processing system can perform the steps outlined above when a change in live odds is detected, such that the user can be provided with a wager recommendation that is determined based on real-time wagering data. Once the wager recommendation has been generated by the wager processing system, the wager processing system can transmit the wager recommendation to the client device that provided the request for the wager recommendation.

In a non-limiting example of a use case for the method 600, a user may execute a wagering application on a mobile device that communicates with the wager processing system. The wagering application can include interactive user interface elements that allow a user to select races, horses, and wager amounts. In addition, the wagering application can include a user interface element that allows a user to request recommendations to bet on particular horses, such as undervalued horses. The wager processing system, upon receiving a list of estimated (real) odds for horses from the user or a third party race prediction system, using the operations of the method 600 described herein, can identify one or more recommended horses and calculate bet amounts based on one of the strategies, such as a Dutch strategy.

The wager processing system can transmit the one or more recommended horses and associated bets to the mobile device, which can display identifiers of the one or more recommended horses and the expected payout of each bet in a user interface of the wagering application. As live odds change over time, the wager processing system can determine whether the recommended horses on which to bet have changed. For example, as live odds change, horses that were previously estimated to be undervalued in the horse race may no longer be undervalued, and vice-versa. When a change is detected, the wager processing system can revise the selection of the one or more recommended horses and transmit the revised list of recommended horses to the mobile device for display in the wagering application. These revisions can continue until the start time of the horse race. Using the wagering application, the user can place a wager on one or more of the horses recommended by the wager processing system.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

iteratively identifying, by a computer system including one or more processors, in real-time, live odds of the horse racing event, wherein each iteration includes:

monitoring a plurality of electronic wagers submitted by a plurality of electronic devices corresponding to the horse racing event, each electronic wager identifying at least one horse and a monetary amount associated with a bet on the at least one horse;

calculating, based on monitored data, live data comprising win odds, probables data comprising expected payouts for single event wagers, will pays data comprising expected payouts for multi-race wagers;

calculating an implied probability of winning in one or more first pools of the horse racing event based on the calculated live data, probables data, and will pays data; and executing a feed-forward neural network using monitored data to predict one or more missing data points to calculate implied win probabilities in one or more second pools of the horse racing event for which odds or probables data is not available;

receiving, by the computer system, from a client device, a wager request for the horse racing event, the wager request comprising a request for a betting strategy recommendation based on undervalued horses;

generating, by the computer system, a real-time bet package including a wager recommendation for the client device based on the live odds of the horse racing event and estimated odds for horses participating in a race identified in the wager request; and transmitting, by the computer system to the client device, the real-time bet package for display.

2. The method of claim 1, comprising:

calculating, by the computer system, for each horse participating in the race identified in the wager request, corresponding estimated odds for the horse using a machine learning model trained using historic racing data.

3. The method of claim 2, wherein the machine learning model includes a decision tree model.

4. The method of claim 1, comprising:

identifying, by the computer system, one or more horses participating in the horse racing event having live odds greater than estimated odds for the one or more horses as undervalued horses; and generating, by the computer system, the real-time bet package for the client device based on the one or more horses identified as undervalued horses.

5. The method of claim 4, wherein the one or more horses are one or more first horses and the method comprising:

detecting, by the computer system, a change in the live odds; and in response to detecting the change in the live odds, identifying, by the computer system, one or more horses second horses as undervalued horses;

generating, by the computer system, a second real-time bet package for the client device based on the one or more second horses identified as undervalued horses; and transmitting, by the computer system to the client device, the second real-time bet package for display.

6. The method of claim 4, further comprising:

estimating, by the computer system, an expected payout value for each horse of the one or more horses identified as undervalued horses.

7. The method of claim 6, further comprising:

sorting, by the computer system, the one or more horses identified as undervalued horses based on corresponding expected payout values.

8. The method of claim 6, wherein estimating an expected payout value for an undervalued horse includes:

calculating, by the computer system using a machine learning model and the live odds, a plurality of outcome predictions of a plurality of betting strategies; and determining, by the computer system, the expected payout for the undervalued horse based on the plurality of outcome predictions of the plurality of betting strategies.

9. The method of claim 1, wherein calculating the implied win probabilities in one or more second pools includes using a machine learning model to determine payout odds for the one or more second pools.

10. The method of claim 9, wherein the machine learning model includes a feedforward neural network.

11. A system, comprising:

one or more processors; and a memory storing executable instructions, the executable instructions when executed by the one or more processors cause the one or more processors to:

iteratively identify live odds for a horse racing event, wherein in each iteration the one or more processors:

monitor a plurality of electronic wagers submitted by a plurality of electronic devices corresponding to the horse racing event, each electronic wager identifying at least one horse and a monetary amount associated with a bet on the at least one horse;

calculate, based on monitored data, live data comprising win odds, probables data comprising expected payouts for single event wagers, and will pays data comprising expected payouts for multi-race wagers;

execute a feed-forward neural network using monitored data to predict one or more missing data points to calculate implied win probabilities in one or more second pools of the horse racing event for which odds or probables data is not available; and calculate implied win probabilities in one or more second pools of the horse racing event for which odds or probables data is not available;

receive, from a client device, a wager request for the horse racing event, the wager request comprising a request for a betting strategy recommendation based on undervalued horses;

generate a real-time bet package including a wager recommendation for the client device based on the live odds of the horse racing event and estimated odds for horses participating in a race identified in the wager request; and transmit, to the client device, the real-time bet package for display.

12. The system of claim 11, wherein the one or more processors are configured to:

calculate for each horse participating in the race identified in the wager request, corresponding estimated odds for the horse using a machine learning model trained using historic racing data.

13. The system of claim 12, wherein the machine learning model includes a decision tree model.

14. The system of claim 1, wherein the one or more processors are configured to:

identify one or more horses participating in the horse racing event having live odds greater than estimated odds for the one or more horses as undervalued horses; and generate the real-time bet package for the client device based on the one or more horses identified as undervalued horses.

15. The system of claim 14, wherein the one or more horses are one or more first horses and wherein the one or more processors are configured to:

detect a change in the live odds; and in response to detecting the change in the live odds, identify one or more horses second horses as undervalued horses;

generate a second real-time bet package for the client device based on the one or more second horses identified as undervalued horses; and transmit, to the client device, the second real-time bet package for display.

16. The system of claim 14, wherein the one or more processors are configured to:

estimate an expected payout value for each horse of the one or more horses identified as undervalued horses.

17. The system of claim 16, wherein the one or more processors are configured to:

sort the one or more horses identified as undervalued horses based on corresponding expected payout values.

18. The system of claim 16, wherein in estimating an expected payout value for an undervalued horse the one or more processors are configured to:

calculate, using a machine learning model and the live odds, a plurality of outcome predictions of a plurality of betting strategies; and determine the expected payout for the undervalued horse based on the plurality of outcome predictions of the plurality of betting strategies.

19. The system of claim 11, wherein in calculating the implied win probabilities in one or more second pools the one or more processors are configured to use a machine learning model to determine payout odds for the one or more second pools.

20. A non-transitory computer-readable medium storing computer instructions, the computer instructions when executed by one or more processors cause the one or more processors to:

iteratively identify live odds for a horse racing event, wherein in each iteration the one or more processors:

monitor a plurality of electronic wagers submitted by a plurality of electronic devices corresponding to the horse racing event, each electronic wager identifying at least one horse and a monetary amount associated with a bet on the at least one horse;

calculate, based on monitored data, live data comprising win odds, probables data comprising expected payouts for single event wagers, and will pays data comprising expected payouts for multi-race wagers;

calculate an implied probability of winning in one or more first pools of the horse racing event based on the calculated live data, probables data, and will pays data; and execute a feed-forward neural network using monitored data to predict one or more missing data points to calculate implied win probabilities in one or more second pools of the horse racing event for which odds or probables data is not available;

receive, from a client device, a wager request for the horse racing event, the wager request comprising a request for a betting strategy recommendation based on undervalued horses;

generate a real-time bet package including a wager recommendation for the client device based on the live odds of the horse racing event and estimated odds for horses participating in a race identified in the wager request; and transmit, to the client device, the real-time bet package for display.

* * * * *